US010406471B2

United States Patent
Sakano et al.

(10) Patent No.: US 10,406,471 B2
(45) Date of Patent: Sep. 10, 2019

(54) FILTER MEDIUM FOR AIR FILTER, FILTER PACK, AIR FILTER UNIT, AND METHOD FOR PRODUCING FILTER MEDIUM FOR AIR FILTER

(71) Applicant: DAIKIN INDUSTRIES, LTD., Osaka-shi, Osaka (JP)

(72) Inventors: Tatsumi Sakano, Osaka (JP); Kunihiko Inui, Osaka (JP); Yoshiyuki Shibuya, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/235,143

(22) Filed: Dec. 28, 2018

(65) Prior Publication Data

US 2019/0134552 A1 May 9, 2019

Related U.S. Application Data

(62) Division of application No. 15/538,597, filed as application No. PCT/JP2015/085992 on Dec. 24, 2015, now Pat. No. 10,226,730.

(30) Foreign Application Priority Data

Dec. 26, 2014 (JP) ................................ 2014-266290
Jul. 22, 2015 (JP) ................................ 2015-145306

(51) Int. Cl.
*B01D 53/22* (2006.01)
*B01D 46/52* (2006.01)
(Continued)

(52) U.S. Cl.
CPC ......... *B01D 46/521* (2013.01); *B01D 39/163* (2013.01); *B01D 39/1607* (2013.01);
(Continued)

(58) Field of Classification Search
CPC .......... B01D 39/163; B01D 2239/0622; B01D 69/12; B01D 2239/065; B01D 39/1623;
(Continued)

(56) References Cited

U.S. PATENT DOCUMENTS 6,261,979 B1 7/2001 Tanaka et al.
6,391,075 B1 5/2002 Meiji et al.
(Continued)

FOREIGN PATENT DOCUMENTS

EP 0 970 739 A1 1/2000
JP 2006-331722 A 12/2006
(Continued)

OTHER PUBLICATIONS

European Search Report of corresponding EP Application No. 15 87 3157.0 dated Dec. 1, 2017.
(Continued)

*Primary Examiner* — Anthony R Shumate
(74) *Attorney, Agent, or Firm* — Global IP Counselors, LLP

(57) ABSTRACT

A filter medium includes first and second porous films mainly containing fluororesin, and a pre-collection member upstream of the first film. The pre-collection member has a pressure drop when air is passed through at a flow rate of 5.3 cm/s of between 15 Pa and 55 Pa, a collection efficiency of NaCl particles having a particle diameter of 0.3 μm when air containing the particles is passed through at a flow rate of 5.3 cm/s of between 25% and 80%, a thickness of 0.4 mm or less, and a PF value between 7 and 15. A ratio of the PF value of the pre-collection member to the PF value when the first and second films are overlapped, is between 0.20 and 0.45. The filter medium can be in a filter pack or filter unit, and produced by integrating the films and the pre-collection member using heat lamination.

11 Claims, 5 Drawing Sheets

(51) Int. Cl.
| | |
|---|---|
| B32B 3/28 | (2006.01) |
| D04H 3/011 | (2012.01) |
| B32B 15/14 | (2006.01) |
| B32B 15/02 | (2006.01) |
| B32B 7/12 | (2006.01) |
| B32B 7/02 | (2019.01) |
| B32B 5/26 | (2006.01) |
| B32B 5/08 | (2006.01) |
| B32B 5/02 | (2006.01) |
| D04H 3/16 | (2006.01) |
| B32B 5/24 | (2006.01) |
| B01D 46/10 | (2006.01) |
| B01D 39/16 | (2006.01) |
| B32B 5/18 | (2006.01) |
| B01D 71/36 | (2006.01) |
| B01D 69/12 | (2006.01) |
| B01D 46/00 | (2006.01) |
| D04H 3/004 | (2012.01) |
| D04H 3/007 | (2012.01) |
| B32B 3/26 | (2006.01) |

(52) U.S. Cl.
CPC ..... *B01D 39/1623* (2013.01); *B01D 39/1692* (2013.01); *B01D 46/0001* (2013.01); *B01D 46/10* (2013.01); *B01D 69/12* (2013.01); *B01D 71/36* (2013.01); *B32B 3/26* (2013.01); *B32B 3/28* (2013.01); *B32B 5/022* (2013.01); *B32B 5/024* (2013.01); *B32B 5/028* (2013.01); *B32B 5/08* (2013.01); *B32B 5/18* (2013.01); *B32B 5/24* (2013.01); *B32B 5/26* (2013.01); *B32B 7/02* (2013.01); *B32B 7/12* (2013.01); *B32B 15/02* (2013.01); *B32B 15/14* (2013.01); *D04H 3/004* (2013.01); *D04H 3/007* (2013.01); *D04H 3/011* (2013.01); *D04H 3/16* (2013.01); *B01D 2239/065* (2013.01); *B01D 2239/0622* (2013.01); *B01D 2239/0668* (2013.01); *B01D 2239/10* (2013.01); *B01D 2239/1216* (2013.01); *B01D 2239/1233* (2013.01); *B01D 2275/10* (2013.01); *B01D 2279/60* (2013.01); *B32B 2250/03* (2013.01); *B32B 2250/05* (2013.01); *B32B 2250/20* (2013.01); *B32B 2250/42* (2013.01); *B32B 2255/02* (2013.01); *B32B 2255/26* (2013.01); *B32B 2262/0238* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/0292* (2013.01); *B32B 2262/101* (2013.01); *B32B 2262/106* (2013.01); *B32B 2262/12* (2013.01); *B32B 2262/14* (2013.01); *B32B 2264/0257* (2013.01); *B32B 2264/102* (2013.01); *B32B 2264/104* (2013.01); *B32B 2264/107* (2013.01); *B32B 2264/12* (2013.01); *B32B 2307/30* (2013.01); *B32B 2307/306* (2013.01); *B32B 2307/50* (2013.01); *B32B 2307/51* (2013.01); *B32B 2307/518* (2013.01); *B32B 2307/54* (2013.01); *B32B 2307/714* (2013.01); *B32B 2307/724* (2013.01); *B32B 2307/732* (2013.01); *B32B 2307/734* (2013.01); *B32B 2435/02* (2013.01); *B32B 2457/00* (2013.01); *B32B 2457/14* (2013.01); *B32B 2509/00* (2013.01); *B32B 2535/00* (2013.01)

(58) Field of Classification Search
CPC .. B01D 46/521; B01D 71/36; B01D 39/1607; B01D 46/0001; B01D 46/10; B01D 39/1692; B01D 2239/0668; B01D 2239/10; B01D 2239/1216; B01D 2239/1233; B01D 2275/10; B01D 2279/60; B32B 5/024; B32B 7/12; B32B 5/028; B32B 3/28; B32B 5/022; B32B 5/08; B32B 15/02; B32B 7/02; B32B 3/26; B32B 5/18; B32B 15/14; B32B 5/26; B32B 5/24; B32B 2457/00; B32B 2457/14; B32B 2509/00; B32B 2535/00; B32B 2250/03; B32B 2250/05; B32B 2250/20; B32B 2250/42; B32B 2255/02; B32B 2255/26; B32B 2262/0238; B32B 2262/0253; B32B 2262/0261; B32B 2262/0269; B32B 2262/0276; B32B 2262/0284; B32B 2262/0292; B32B 2262/101; B32B 2262/106; B32B 2262/12; B32B 2262/14; B32B 2264/0257; B32B 2264/102; B32B 2264/104; B32B 2264/107; B32B 2264/12; B32B 2307/30; B32B 2307/306; B32B 2307/50; B32B 2307/51; B32B 2307/518; B32B 2307/54; B32B 2307/714; B32B 2307/724; B32B 2307/732; B32B 2307/734; B32B 2435/02; D04H 3/011; D04H 3/004; D04H 3/16; D04H 3/007

See application file for complete search history.

(56) References Cited

U.S. PATENT DOCUMENTS

| | | |
|---|---|---|
| 2001/0021075 A1 | 9/2001 | Kitazaki et al. |
| 2004/0168417 A1 | 9/2004 | Tanaka et al. |
| 2010/0269464 A1 | 10/2010 | Mori et al. |
| 2014/0165517 A1 | 6/2014 | Hara et al. |
| 2015/0082757 A1 | 3/2015 | Chaen et al. |
| 2017/0128876 A1 | 5/2017 | Shibuya et al. |

FOREIGN PATENT DOCUMENTS

| | | |
|---|---|---|
| JP | 2009-136863 A | 6/2009 |
| JP | 2013-52320 A | 3/2013 |
| JP | 2013-63424 A | 4/2013 |
| JP | 2013-94717 A | 5/2013 |
| WO | 2013/157647 A1 | 10/2013 |

OTHER PUBLICATIONS

International Preliminary Report of corresponding PCT Application No. PCT/JP2015/085992 dated Jun. 27, 2017.

FILTER MEDIUM FOR AIR FILTER, FILTER PACK, AIR FILTER UNIT, AND METHOD FOR PRODUCING FILTER MEDIUM FOR AIR FILTER

CROSS-REFERENCE TO RELATED APPLICATIONS

This application is a divisional application of U.S. patent application Ser. No. 15/538,597 filed on Jun. 21, 2017, which is a National Stage application of International Patent Application No. PCT/JP2015/085992 filed on Dec. 24, 2015. The entire disclosure of U.S. patent application Ser. No. 15/538,597 is hereby incorporated herein by reference.

The present invention relates to a filter medium for an air filter, a filter pack, an air filter unit, and a method for producing a filter medium for an air filter.

BACKGROUND ART

As filter medium for an air filter to meet the criteria for high efficiency particulate air (HEPA) filters, filter medium fabricated using glass fibers, called glass filter medium, are known. While glass filtration media of HEPA grade have a high collection efficiency; i.e., 99.97%, for particles having a particle diameter of 0.3 μm, pressure drop is high.

As HEPA filters with low pressure drop in place of this kind of glass filter medium, filter medium using PTFE porous film produced by stretching polytetrafluoroethylene (PTFE) are known. Compared to glass filter medium, PTFE porous films have higher collection efficiency and lower pressure drop, and have an excellent balance between collection efficiency and pressure drop.

For example, in Japanese Laid-open Patent Publication Nos. 2013-52320 and 2013-63424 noted hereafter, to suppress pressure drop for an air filter unit used while retained by a shape retaining member, there are proposed filter medium for an air filter for which a melt-blown nonwoven is provided on the upstream side of the PTFE porous film, and an air-permeable cover layer composed of a spun-bonded nonwoven is further provided to the upstream side.

SUMMARY

In recent years, there has been a demand to increase the dust holding capacity of the filtration media in order to lengthen the product life of the filtration media. For example, when using an air filter unit for gas turbine intake applications the air filter may clog before a periodic inspection of the gas turbine because of the small dust holding capacity of the air filter unit. When such clogging occurs, it is necessary to stop operation of the gas turbine merely to exchange the air filter, causing great loss.

By contrast, though the air filters noted in the Japanese Laid-open Patent Publication Nos. 2013-52320 and 2013-63424 have high collection efficiency and low pressure drop, they have insufficient dust holding capacity, and there is demand for even further improvement in dust holding capacity.

An object of the present invention is to provide a filter medium for an air filter, a filter pack, an air filter unit, and a method for producing a filter medium for an air filter having not only high collection efficiency and low pressure drop, but also a high dust holding capacity.

As a result of painstaking research directed to solving the aforementioned problem, the inventors perfected the present invention upon discovering that by providing two layers of porous film mainly containing fluororesin, and a pre-collection member of specific physical properties on the upstream side, and by using a specific range for the ratio of the PF value of the pre-collection member/the PF value when a first porous film and a second porous film are overlapped, it is possible to have not only high collection efficiency and low pressure drop, but also high dust holding capacity.

The filter medium for an air filter according to the first aspect is a filter medium for an air filter to collect dust in a gas, provided with a first porous film, a second porous film, and a pre-collection member. The first porous film mainly contains a fluororesin. The second porous film mainly contains a fluororesin, and is arranged to the downstream side of the first porous film in the air current. The pre-collection member is arranged to an upstream side of the first porous film in the air current, and collects a portion of the dust in the air current. The pre-collection member has a pressure drop when air is passed therethrough at a flow rate of 5.3 cm/s of 15 Pa or greater and less than 55 Pa, a collection efficiency of NaCl particles having a particle diameter of 0.3 μm of 25% or greater and less than 80%, a thickness of 0.4 mm or less, and a PF value determined from the following formula: PF value={−log((100−collection efficiency (%))/100)}/(pressure drop (Pa)/1000) of 7 or greater and 15 or less. A value of "the PF value of the pre-collection member/a PF value when the first porous film and the second porous film are overlapped," which is a ratio of the PF value of the pre-collection member to the PF value when the first porous film and the second porous film are overlapped is 0.20 or greater and 0.45 or less.

The abovementioned PF value of the pre-collection member is preferably 7 or greater and 13 or less.

With this filter medium for an air filter, not only is the collection efficiency high and the pressure drop low, but it is also possible to increase the dust holding capacity.

The filter medium for an air filter of the second aspect is the filter medium for an air filter according to the first aspect, further provided with an upstream air-permeable support member. The upstream air-permeable support member is arranged to the upstream side of the first porous film in the air current, and supports the first porous film.

The pre-collection member may be arranged further to the upstream side in the air current than the first porous film, and can also be arranged further to the upstream side in the air current than the upstream air-permeable support member, or arranged further to the downstream side in the air current of the upstream air-permeable support member.

This filter medium for an air filter enables increased strength at the upstream side.

The filter medium for an air filter of the third aspect is the filter medium for an air filter according to the first or second aspect, further provided with a downstream air-permeable support member. The downstream air-permeable support member is arranged to the downstream side of the second porous film in the air current, and supports the second porous film.

This filter medium for an air filter enables increased strength at the downstream side.

The filter medium for an air filter of the fourth aspect is the filter medium for an air filter according to any of the first to third aspects, for which the pressure drop is smaller with the first porous film than with the second porous film when air passes through at a flow rate of 5.3 cm/s, and the collection efficiency of NaCl particles having a particle diameter of 0.3 μm is higher with the second porous film than with the first porous film.

This filter medium for an air filter not only has high collection efficiency and low pressure drop, but also enables a further increase in the dust holding capacity.

The filter medium for an air filter of the fifth aspect is the filter medium for an air filter according to any of the first to fourth aspects, for which the first porous film has the pressure drop of 30 Pa or greater and 90 Pa or less, the collection efficiency of 95% or greater and 99% or less, and when air containing polyalphaolefin particles having a count median particle diameter of 0.25 µm continuously passes through at a flow rate of 5.3 cm/s, and the pressure drop is increased by 250 Pa, a dust holding capacity of the polyalphaolefin particles is 25 g/m² or greater and 35 g/m² or less.

This filter medium for an air filter not only has high collection efficiency and low pressure drop, but also enables a further increase in the dust holding capacity.

The filter medium for an air filter of the sixth aspect is the filter medium for an air filter according to any of the first to fifth aspects, for which the value of "the PF value of the pre-collection member/the PF value when the first porous film and the second porous film are overlapped," which is the ratio of the PF value of the pre-collection member to the PF value when the first porous film and the second porous film are overlapped, is 0.20 or greater and 0.38 or less.

This filter medium for an air filter is able to keep pressure drop low even when the dust holding capacity is increased.

The filter medium for an air filter of the seventh aspect is the filter medium for an air filter according to any of the first to sixth aspects, for which the first porous film and the second porous film mainly comprise fibril-forming polytetrafluoroethylene, a non-fibril-forming non-melting-processable component, and a non-fibril-forming hot-melt-processable component having a melting point below 320° C.

With a conventional PTFE porous film configured mainly from only fibril-forming PTFE (high molecular weight PTFE), there are many fine fibrils with a thin fiber diameter, and while the surface area per fiber is large and the collection efficiency is high, the film thickness is relatively thin, and since there is a large amount of fiber overlap with each other, it is not possible to perform dust collection of a large number of microparticles, so the high collection efficiency per fiber is not exhibited effectively.

In contrast to this, the present filter medium for an air filter is configured including three main components: a fibril-forming polytetrafluoroethylene, a non-fibril-forming non-melting-processable component, and a non-fibril-forming hot-melt-processable component having a melting point below 320° C., so compared to the prior art PTFE porous film, it is possible to increase the dust holding capacity by using relatively thick fibers to have a large number of voids and increase the film thickness.

The filter medium for an air filter of the eighth aspect is the filter medium for an air filter according to any of the first to seventh aspects, for which in the filter medium for an air filter, when air containing polyalphaolefin particles having a count median particle diameter of 0.25 µm continuously passes through at a flow rate of 5.3 cm/s, and the pressure drop is increased by 250 Pa, a dust holding capacity of the polyalphaolefin particles is 40 g/m² or greater.

The filter medium for an air filter of the ninth aspect is the filter medium for an air filter according to any of the first to eighth aspects, for which in the filter medium for an air filter, the pressure drop when air passes through at a flow rate of 5.3 cm/s is less than 200 Pa, and the collection efficiency of NaCl particle having a particle diameter of 0.3 µm when air containing the particles passes through at a flow rate of 5.3 cm/s is 99.97% or greater.

The air filter pack according to the tenth aspect is provided with the filter medium for an air filter according to any of the first to ninth aspects, and the filter pack is configured to have the filter medium for an air filter processed into a zigzag configuration having mountain folds and valley folds repeated in alternating fashion. There are no particular limitations as to the "filter pack," but should, for example, have a zigzag configuration produced by alternate folding into mountain folds and valley folds, and not a flat sheet shape; and should be shaped to permit accommodation within any frame.

The air filter unit according to the eleventh aspect is provided with the filter medium for an air filter according to any of the first to ninth aspects or the filter pack according to the tenth aspect, and a frame to retain the filter medium for an air filter or the filter pack.

The method for producing a filter medium for an air filter according to the twelfth aspect is a method for producing a filter medium for an air filter to collect dust in a gas, comprising a step to obtain a first porous film and a second porous film mainly containing a fluororesin, a step to arrange the first porous film to an upstream side of the second porous film in an air current, and a step to arrange a pre-collection member to collect a portion of the dust in the air current to the upstream side of the first porous film in the air current. The pre-collection member has a pressure drop when air is passed therethrough at a flow rate of 5.3 cm/s of 15 Pa or greater and less than 55 Pa, a collection efficiency of NaCl particles having a particle diameter of 0.3 µm of 25% or greater and less than 80%, a thickness of 0.4 mm or less, and a PF value determined from the following formula: PF value={−log ((100−collection efficiency (%))/100)}/(pressure drop (Pa)/1000) of 7 or greater and 15 or less. A value of "the PF value of the pre-collection member/a PF value when the first porous film and the second porous film are overlapped," which is a ratio of the PF value of the pre-collection member to the PF value when the first porous film and the second porous film are overlapped, is 0.20 or greater and 0.45 or less. Also, this producing method further comprises a step of integrating the first porous film, the second porous film, and the pre-collection member by heat lamination.

It is preferable that the abovementioned PF value of the pre-collection member be 7 or greater and 13 or less.

With this method for producing a filter medium for an air filter, not only is the collection efficiency high and the pressure drop low, but it is also possible to obtain a filter medium for an air filter with higher dust holding capacity.

The method for producing a filter medium for an air filter according to the thirteenth aspect is the method for producing a filter medium for an air filter according to the twelfth aspect, further provided with a step of arranging the upstream air-permeable support member to support the first porous film to the upstream side of the first porous film in the air current.

The pre-collection member can be arranged further to the upstream side in the air current than the first porous film, can be arranged further to the upstream side in the air current than the upstream air-permeable support member, or can be arranged further to the downstream side in the air current than the upstream air-permeable support member.

With this method for producing a filter medium for an air filter, it is possible to increase the strength at the upstream side of the obtained filter medium for an air filter.

The method for producing a filter medium for an air filter according to the fourteenth aspect is the method for producing a filter medium for an air filter according to the twelfth or thirteenth aspect, further provided with a step of arranging the downstream air-permeable support member to support the second porous film to the downstream side of the second porous film in the air current.

With this method for producing a filter medium for an air filter, increasing the strength at the downstream side of the obtained filter medium for an air filter is enabled.

Using the filter medium for an air filter, the filter pack, or the air filter unit of the present invention, is possible to have not only high collection efficiency and low pressure drop, but also to increase the dust holding capacity.

Also, using the method for producing a filter medium for an air filter of the present invention, it is possible to obtain a filter medium for an air filter with not only high collection efficiency and low pressure drop, but also increased dust holding capacity.

DETAILED DESCRIPTION OF EMBODIMENTS

A filter medium for an air filter (hereinafter also called simply "filter medium"), a filter pack, an air filter unit, and a method for producing a filter medium for an air filter are described below using embodiments as examples.

(1) Filter Medium For an Air Filter

Figure 1:
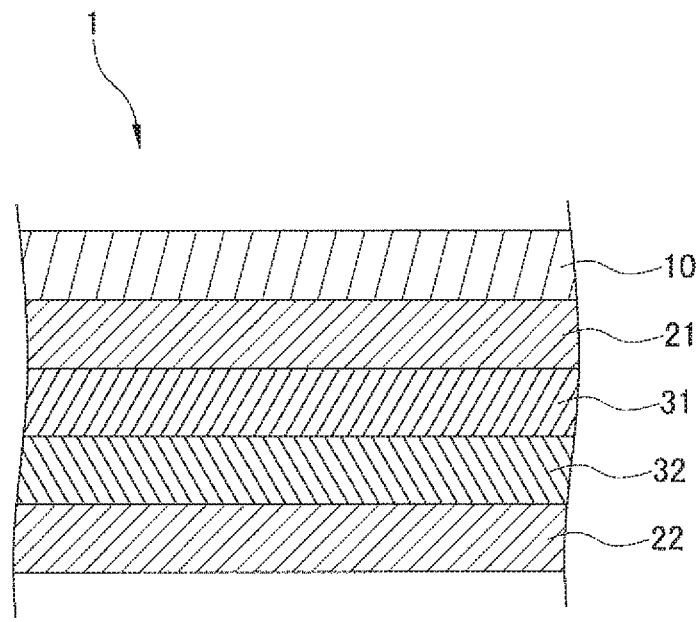
FIG. 1 is a schematic cross sectional view of the layer configuration of a 5-layer structure filter medium of the present embodiment.

FIG. 1 shows a schematic cross sectional view of a 5-layer structure filter medium for an air filter 1 according to the present embodiment.

The filter medium for an air filter 1 is a filter medium for an air filter to collect dust in a gas, and is provided with a pre-collection member 10, a desired upstream air-permeable support member 21, a first porous film 31, a second porous film 32, and any downstream air-permeable support member 22, in order from the upstream side in the air current,.

The first porous film 31 contains mainly fluororesin. The second porous film 32 contains mainly fluororesin, and is arranged so as to be mutually adjacent further to the downstream side in the air current than the first porous film 31. The upstream air-permeable support member 21 is arranged further to the upstream side in the air current than the first porous film 31, and supports the first porous film 31. The downstream air-permeable support member 22 is arranged further to the downstream side in the air current than the second porous film 32, and supports the second porous film 32. The pre-collection member 10 is arranged further to the upstream side in the air current than the first porous film 31 (in the present embodiment, further to the upstream side in the air current than the upstream air-permeable support member 21), and collects a portion of the dust in the air current. The pre-collection member 10 has a pressure drop when air passes through at a flow rate of 5.3 cm/s of 15 Pa or greater and less than 55 Pa, a collection efficiency of NaCl particles having a particle diameter of 0.3 μm of 25% or greater and less than 80%, a thickness of 0.4 mm or less, and a PF value found with the following formula: PF value={−log((100−collection efficiency (%))/100)}/(pressure drop (Pa)/1000) of 7 or greater and 15 or less. The "PF value of the pre-collection member 10/the PF value when the first porous film 31 and the second porous film 32 are overlapped," which is the ratio of the PF value of the pre-collection member 10 to the PF value when the first porous film 31 and the second porous film 32 are overlapped, is 0.20 or greater and 0.45 or less.

There follows a specific description of each layer and the relationship between layers below.

(2) Porous Films

Both the first porous film 31 and the second porous film 32 are configured mainly containing fluororesin, and have a porous film structure which has fibrils (fibers) and nodes (nodal portions) connected to the fibrils (not shown).

Here, "mainly" means that when a plurality of types of components are contained, the fluororesin volume is the largest. The first porous film 31 and the second porous film 32 can also, for example, contain fluororesin exceeding 50 wt % of the overall configuration components. Specifically, the first porous film 31 and the second porous film 32 can contain non-fluororesin components at less than 50 wt %.

An example of a component other than fluororesin that can be cited is an inorganic filler which is a non-fibril-forming non-melting-procesable component (component B), described later. The first porous film 31 is placed at the upstream side in the air current (upward in FIG. 1) and the second porous film 32 is placed further to the downstream side in the air current than the first porous film 31 (downward in FIG. 1).

The first porous film 31 and the second porous film 32 can have the same film configuration as each other and can also have a different film configuration from each other.

The fluororesin used for the first porous film 31 and the second porous film 32 can be composed of one type of component or can also be composed of two or more types of component. As the fluororesin composed of two or more types of component, an example can be cited of a mixture of three components, for example a fibril-forming PTFE (hereafter also referred to as "component A"), a non-fibril-forming non-melting-proces sable component (hereafter also referred to as "component B"), and a hot-melt-processable component of melting point less than 320° C. (hereafter also referred to as component C). The first porous film 31 preferably comprises a combination of these three types of components. Compared to the conventional fibril-forming PTFE (high molecular weight PTFE), the first porous film 31 composed of these three types of components, has a film structure with a higher void content and greater film thickness, and is thereby able to collect microparticles in a gas in a broad thickness-direction area of the filter medium, whereby the dust holding capacity can be increased. From this perspective, it is preferable to have not only the first porous film 31 but rather both the first porous film 31 and the second porous film 32 comprise these three types of components. It is thereby possible to adequately ensure the overall thickness of the filter medium 1, and the dust holding capacity is further increased.

There follows a detailed description of the abovementioned three types of components below. The applicable contents of either the first porous film 31 or the second porous film 32 will not be described individually; merely the expression "porous film" will be used.

(2-1) Component A: Fibril-Forming PTFE

The fibril-forming PTFE is, for example, a high-molecular weight PTFE obtained by emulsion polymerization or suspension polymerization of tetrafluoroethylene (TFE). By "high molecular weight" is meant a molecular weight of such magnitude that fibril formation readily occurs in the course of stretching during porous film fabrication, and fibrils of extended length are obtained; the standard specific gravity (SSG) is 2.130-2.230; and due to the high melt viscosity, there is substantially no melt flow by the material. In terms of ease of fibril formation and obtaining fibrils of extended length, the SSG of the fibril-forming PTFE is preferably 2.130-2.190, and more preferably 2.140-2.170. When the SSG is too high, there is a risk that the mixture of the components A to C will have poor stretchability, whereas when the SSG is too low, there is a risk of poor rollability, poor homogeneity of the porous film, and high pressure drop of the porous film. Also, in terms of ease of fibril formation and obtaining fibrils of extended length, the PTFE is preferably one obtained through emulsion polymerization. The standard specific gravity (SSG) is measured in accordance with ASTM D 4895.

The presence or absence of the fibril-forming property, i.e., whether or not the material is able to form fibrils, can be determined based on whether paste extrusion, which is the typical method to mold of high-molecular weight PTFE powders made from polymers of TFE, is possible. Normally, the reason that paste extrusion of a material is possible is that the high-molecular weight PTFE has fibril-forming properties. In cases in which an unbaked molded body obtained by paste extrusion has no substantial strength and/or stretch, e.g., cases in which a material has 0% stretch and severs when pulled, the material may be considered to lack fibril-forming ability.

The aforementioned high-molecular weight PTFE may be a modified polytetrafluoroethylene (hereinafter termed "modified PTFE"), a homo-polytetrafluoroethylene (hereinafter termed "homo-PTFE"), or a mixture of modified PTFE and homo-PTFE. There are no particular limitations as to the homo-PTFE, and the homo-PTFE disclosed inter alia in Japanese Laid-open Patent Publication No. S53-60979, Japanese Laid-open Patent Publication No. S57-135, Japanese Laid-open Patent Publication No. S61-16907, Japanese Laid-open Patent Publication No. S62-104816, Japanese Laid-open Patent Publication No. S62-190206, Japanese Laid-open Patent Publication No. S63-137906, Japanese Laid-open Patent Publication No. 2000-143727, Japanese Laid-open Patent Publication No. 2002-201217, WO2007/046345, WO2007/119829, WO2009/001894, WO2010/113950, and WO2013/027850 can be used to good advantage. Of these, homo-PTFE having high stretching properties, such as those disclosed inter alia in Japanese Laid-open Patent Publication No. S57-135, Japanese Laid-open Patent Publication No. S63-137906, Japanese Laid-open Patent Publication No. 2000-143727, Japanese Laid-open Patent Publication No. 2002-201217, WO2007/046345, WO2007/119829, and WO2010/113950 are preferred.

Modified PTFE comprises TFE and monomers other than TFE (hereinafter termed "modifying monomers"). As modified PTFE there may be cited materials uniformly modified by modifying monomers, those modified in the initial phase of the polymerization reaction, those modified in the final phase of the polymerization reaction, etc., with no particular limitations. The modified PTFE disclosed, for example, inter alia in Japanese Laid-open Patent Publication No. S60-42446, Japanese Laid-open Patent Publication No. S61-16907, Japanese Laid-open Patent Publication No. S62-104816, Japanese Laid-open Patent Publication No. S62-190206, Japanese Laid-open Patent Publication No. S64-1711, Japanese Laid-open Patent Publication No. H02-261810, Japanese Laid-open Patent Publication No. H11-240917, Japanese Laid-open Patent Publication No. H11-240918, WO2003/033555, WO2005/061567, WO2007/005361, WO2011/055824, and WO2013/027850 can be used to good advantage. Of these, modified PTFE having high stretching properties, such as those disclosed inter alia in Japanese Laid-open Patent Publication No. S61-16907, Japanese Laid-open Patent Publication No. S62-104816, Japanese Laid-open Patent Publication No. S64-1711, Japanese Laid-open Patent Publication No. H11-240917, WO2003/033555, WO2005/061567, WO2007/005361, and WO2011/055824 are preferred.

The modified PTFE includes TFE units based on TFE, and modifying monomer units based on a modifying monomer. The modifying monomer units are sections which are part of the molecular structure of the modified PTFE, and which are derived from the modifying monomer. The modified PTFE preferably includes modifying monomer units at a level equivalent to 0.001-0.500 wt %, and more preferably 0.01-0.30 wt %, of all monomer units. All monomer units refer to sections derived from all of the monomers in the molecular structure of the modified PTFE.

There are no particular limitations as to the modifying monomer other than the ability to copolymerize with TFE; for example, there may be cited perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkyl ethylene (PFAE), ethylene, etc. A single type of modifying monomer, or multiple types, may be employed.

There are no particular limitations as to the perfluorovinyl ether, and perfluoro unsaturated compounds such as those represented by general formula (1) may be cited, for example.

$$CF_2=CF-ORf \qquad (1)$$

In the formula, Rf represents a perfluoro organic group.

Herein, a perfluoro organic group refers to an organic group in which all of the hydrogen atoms bonded to the carbon atoms are substituted by fluorine atoms. The aforementioned perfluoro organic group may have an ether oxygen.

As perfluorovinyl ethers, there may be cited, for example, perfluoro(alkyl vinyl ethers) (PAVE) in which Rf in the aforementioned general formula (1) is a C1-10 perfluoroalkyl group. The carbon number of the perfluoroalkyl group is preferably 1 to 5. As perfluoroalkyl groups in PAVE, there may be cited, for example, a perfluoromethyl group, a perfluoroethyl group, a perfluoropropyl group, a perfluorobutyl group, a perfluoropentyl group, a perfluorohexyl group, etc. Perfluropropyl vinyl ether (PPVE) and perfluoromethyl vinyl ether (PMVE) are preferred PAVE varieties.

There are no particular limitations as to the aforementioned perfluoroalkyl ethylene (PFAE), and there may be cited, for example, perfluorobutyl ethylene (PFBE), perfluorohexyl ethylene (PFHE), etc.

The modifying monomer in the modified PTFE is preferably at least one selected from the group composed of HFP, CTFE, VDF, PAVE, PFAE, and ethylene.

From the perspective of ease of fibril formation and ability to obtain long fibrils in particular, the homo-PTFE preferably contains more than 50 wt % of fibril-forming PTFE.

The fibril-forming PTFE can also be a combination of a plurality of the abovementioned components.

From the perspective of maintaining the fibril structure of the porous film, the fibril-forming PTFE is preferably contained at a level exceeding 50 wt % of the porous film.

(2-2) Component B: Non-Fibril-Forming Non-Melting-Processable Component

The non-fibril-forming non-melting-processable component takes the form of non-fibriform particles unevenly present mainly in the nodes, and has the action of suppressing fibril formation by the fibril-forming PTFE.

As the non-fibril-forming non-melting-processable component, there may be cited, for example, low-molecular weight PTFE or other such component having thermoplasticity, thermosetting resins, inorganic fillers, or combinations of these.

The component having thermoplasticity will preferably have a melting point of 320° C. or above, and high melt viscosity. For example, low-molecular weight PTFE, due its high melt viscosity, can remain in nodal areas even during processing at temperatures above the melting point. Herein, low-molecular weight PTFE is PTFE having number-average molecular weight of 600,000 or less, a melting point of 320° C. or higher and 335° C. or lower, and a 380° C. melt viscosity of 100 Pa·s or greater and $7.0 \times 10^5$ Pa·s or less (see Japanese Laid-open Patent Publication No. H10-147617).

As methods to manufacture low-molecular weight PTFE, there may be cited a method in which a high-molecular weight PTFE powder (molding powder) obtained by suspension polymerization of TFE, or a high-molecular weight PTFE powder (fine powder) obtained by emulsion polymerization of TFE, and a specific fluoride are made to undergo a contact reaction under high temperature and thermally decomposed (see Japanese Laid-open Patent Publication No. S61-162503), a method in which the aforedescribed high-molecular weight PTFE powder or molded article is irradiated with ionizing radiation (see Japanese Laid-open Patent Publication No. S48-78252), and a method involving direct polymerization of TFE together with a chain transfer agent (see WO2004/050727, WO2009/020187, and WO2010/114033). Like the fibril-forming PTFE, the low-molecular weight PTFE may be homo-PTFE, or a modified PTFE that includes any of the aforementioned modifying monomers.

Low-molecular weight PTFE lacks fibril-forming properties. The existence or lack of fibril-forming properties is determined by the method mentioned above. Low-molecular weight PTFE, in the form of an unbaked molded body obtained by paste extrusion, has no substantial strength and/or stretch, e.g., having 0% stretch, and severing when pulled.

While there are no particular limitations as to the low-molecular weight PTFE employed in the present invention, one having a 380° C. melt viscosity of 1,000 Pa·s or above is preferred, with 5,000 Pa·s or above being more preferred, and 10,000 Pa·s or above especially preferred. With such high melt viscosity, during manufacture of a porous film, even when the non-fibril-forming hot-melt-processable component constituting component (C) melts, the non-fibril-forming non-melting-processable component can remain in the nodes, and fibril-formation can be suppressed.

As thermosetting resins, there may be cited, for example, epoxies, silicone resins, polyester, polyurethane, polyimides, phenols, mixtures of these, and other such resins. From the perspective of ease of operation during co-coagulation, discussed below, it is preferable to employ a resin dispersed in water in an uncured state as the thermosetting resin. Such thermosetting resins can all be procured commercially.

As inorganic fillers, there may be cited talc, mica, calcium silicate, glass fibers, calcium carbonate, magnesium carbonate, carbon fibers, barium sulfate, calcium sulfate, mixtures of these, etc. Of these, the use of talc is preferred, from the perspective of affinity for fibril-forming high molecular weight PTFE and specific gravity. From the perspective of being able to consistently form a stable dispersion during manufacture of the porous film, the inorganic filler used is preferably one having particle diameter of 3 μm or greater and 20 μm or less. Particle diameter is average particle diameter and is measured in accordance with the laser diffraction and scattering method. These inorganic fillers can all be procured commercially.

The non-fibril-forming non-melting-processable components can also be a combination of a plurality of the abovementioned components.

The non-fibril-forming non-melting-processable component is preferably contained at a level of 1-50 wt % of the porous film. By keeping the non-fibril-forming non-melting-processable component content to no more than 50 wt %, the fibril structure of the porous film can be easily maintained. The non-fibril-forming non-melting-processable component is preferably contained at a level of 20 wt % or greater and 40 wt % or less, and more preferably contained at a level of 30 wt %. By adopting a content of 20 wt % or greater and 40 wt % or less, fibril-formation by the fibril-forming PTFE can be suppressed more effectively.

(2-3) Component C: Non-Fibril-Forming Hot-Melt-Processable Component Having Melting Point of Less Than 320° C.

The non-fibril-forming hot-melt-processable component having a melting point of less than 320° C. (hereafter also referred to as "non-fibril-forming hot-melt-processable component") has fluidity when melted, and thereby can melt and solidify in the nodes during manufacture (during stretching) of the porous film, increasing the strength of the porous film overall, and minimizing deterioration in filter performance, even when the material undergoes compression, etc. in subsequent steps.

The non-fibril-forming hot-melt-processable component is preferably one exhibiting a 380° C. melt viscosity of less than 10,000 Pa·s. The melting point of the non-fibril-forming hot-melt-processable component is the peak top of a heat-of-melting curve obtained by increasing the temperature to or above the melting point at a temperature increase rate of 10° C./min by means of a differential scanning calorimeter (DSC) to bring about initial complete melting, cooling to or below the melting point at 10° C./min, and then again increasing the temperature by 10° C./min.

As the non-fibril-forming hot-melt-proces sable component, there may be cited hot-melt-processable fluoropolymers, polystyrene, polyethylene terephthalate (PET), polyester, polyamide, and other such resins or mixtures of these, able to exhibit sufficient melting and fluidity at the stretching temperature during manufacture of the porous film. Among these, hot-melt-processable fluoropolymers are preferred in terms of exceptional heat resistance at the stretching temperature during manufacture of the porous film, and exceptional chemical resistance. As hot-melt-processable fluoropolymers, there may be cited fluoropolymers that include copolymer units derived from at least one, and preferably two or more, fluorinated ethylenically unsaturated monomers represented by general formula (2) below:

$$RCF=CR_2 \quad (2)$$

(in the formula, R is independently selected from H, F, Cl, C1-8 alkyl, C6-8 aryl, C3-10 cycloalkyl, and C1-8 perfluoroalkyl, in which case all R may be the same, or any two R may be the same with the remaining R different therefrom, or all R may be different).

There are no particular limitations as to useful examples of compounds represented by general formula (2), and there may be cited fluoroethylene, VDF, trifluoroethylene, TFE, HEP, and other perfluoroolefins, CTFE, dichlorodifluoroethylene and other chloroolefins, PFBE, PFHE, and other (perfluoroalkyl)ethylene, perfluoro-1,3-dioxole, and mixtures thereof.

The fluoropolymer may also include a copolymer derived from a copolymer of at least one of the monomers represented by the preceding general formula (2), and at least one polymerizable co-monomer represented by the preceding general formula (1) and/or general formula (3) below:

$$R_2C=CR_2 \quad (3)$$

(in the formula, R is independently selected from H, Cl, C1-8 alkyl, C6-8 aryl, and C3-10 cycloalkyl, in which case all R may be the same, or any two or more R may be the same, with these two or more R and the remaining other R being different, or all R may be different from one another, and in the case that there are a plurality of other R, these may differ from one another as well).

As useful examples of compounds represented by general formula (1), there may be cited perfluoro(alkyl vinyl ethers) (PAVE). Perfluoropropyl vinyl ether (PPVE) and perfluoromethyl vinyl ether (PMVE) are preferable PAVE varieties.

As useful examples of compounds represented by general formula (3), there may be cited ethylene, propylene, etc.

As more specific examples of fluoropolymers, there may be cited polyfluoroethylene derived by polymerization of fluoroethylene, polychlorotrifluoroethylene (PCTFE) derived by polymerization of polyvinylidene fluoride (PVDF) derived by polymerization of vinylidene fluoride (VDF), or of chlorotrifluoroethylene (CTFE), fluoropolymers derived from copolymers of two or more different monomers represented by the above general formula (2), and fluoropolymers derived from copolymers of at least one monomer represented by the above general formula (2), and at least one monomer represented by the above general formula (1) and/or at least one represented by the above general formula (3).

Examples of such polymers are polymers having copolymer units derived from VDF and hexafluoropropylene (HFP), and polymers derived from TFE and at least one copolymerizable co-monomer (at least 3 wt %) other than TFE. As fluoropolymers of the latter type, there may be cited TFE/PAVE copolymers (PFA), TFE/PAVE/CTFE copolymers, TFE/HFP copolymers (FEP), TFE/ethylene copolymers (ETFE), TFE/HFP/ethylene copolymers, (EFEP), TFE/VDF copolymers, TFE/VDF/HFP copolymers, TFE/VDF/CTFE copolymers, etc., or mixtures of these.

The non-fibril-forming non-melting-processable component may also be a combination of a plurality of the abovementioned components.

The non-fibril-forming hot-melt-processable component content of the porous film is preferably at least 0.1 wt %, but less than 20 wt %. By keeping the non-fibril-forming hot-melt-processable component to less than 20 wt %, situations in which the component diffuses into sections other than the nodes within the porous film, causing the pressure drop of the porous film to rise, can be suppressed. Moreover, by keeping the content to less than 20 wt %, it is easy to carry out stretching at a high elongation area ratio, namely, a high ratio of 40 or above, as discussed below. By setting the non-fibril-forming hot-melt-processable component level in the porous film to at least 0.1 wt %, deterioration in filter performance of the porous film due to compressive force, etc. in subsequent steps can be suppressed to a sufficient extent. The non-fibril-forming hot-melt-proces sable component content of the porous film is preferably 15 wt % or less, and more preferably 10 wt % or less. From the perspective of ensuring the strength of the porous film, the non-fibril-forming hot-melt-processable component of the porous film is preferably 0.5 wt % or greater. Within that range, about 5 wt % is especially preferred.

In order for stretching by an elongation area ratio of 40-800 to proceed smoothly, the non-fibril-forming hot-melt-proces sable component content is preferably no more than 10 wt %.

With the porous film composed of the three types of components described above, the fibrils mainly comprise component A, and the nodes comprise components A to C. Within the porous film, these nodes are formed relatively large, whereby the porous film is formed to a greater thickness. Also, such nodes are relatively hard due to containing the non-fibril-forming hot-melt-processable component, and function like pillars supporting the porous film in the thickness direction, whereby reduced filter performance of the porous film can be suppressed even if compressive force, etc. in the thickness direction is experienced during subsequent steps such as the pleating process described hereafter.

(2-4) Other Properties of the Porous Film

With the first porous film 31 and the second porous film 32, the filling rate found according to the following formula is preferably 1% or greater and 20% or less, and more preferably 2% or greater and 10% or less.

Filling rate (%)={1−(void volume of porous film/volume of porous film)}×100

The average pore diameter of the first porous film 31 and the second porous film 32 preferably exceeds 1.6 μm, and more preferably the average pore diameter of the first porous film 31 is 3.0 μm or greater and 3.9 μm or less, and the average pore diameter of the second porous film 32 exceeds 1.6 μm and is less than 3.0 μm. By doing this, it is easier to increase the dust holding capacity of the first porous film 31 and the dust holding capacity of the second porous film 32, and it is easier to increase the dust holding capacity of the filter medium 1 overall.

The average pore diameter is measured in compliance with ASTM F316-86. The average pore diameter is also referred to as the average flow channel diameter.

From the perspective of increasing the dust holding capacity and the collection efficiency, the film thickness of the first porous film 31 preferably exceeds 10 μm, and more preferably exceeds 40 μm. The upper limit value of the film thickness of the first porous film 31 is not particularly restricted, and can be 100 μm, for example. Also, for example, when the second porous film 32 comprises the abovementioned three types of components, the film thickness of the second porous film 32 preferably exceeds 10 μm, and more preferably exceeds 40 μm. The upper limit value of the film thickness of the second porous film 32 is not particularly limited, but can be 100 μm, for example.

For the film thickness, the overall thickness with five measurement subjects overlapped was measured, and the numerical value of that value divided by 5 was used as the film thickness of one layer.

The dust holding capacity may be the same or different for the first porous film 31 and the second porous film 32. From the perspective of significantly increasing the dust holding capacity of the filter medium 1 with the collection efficiency of the filter medium 1 kept high, it is preferable to have a difference between the dust holding capacity of the first porous film 31 and the second porous film 32, and to have the dust holding capacity of the first porous film 31 be greater than the dust holding capacity of the second porous film 32.

The dust holding capacity means the dust holding capacity of polyalphaolefin particles when air containing polyalphaolefin (PAO) particles having a count median particle diameter of 0.25 μm continuously passes through at a flow rate of 5.3 cm/s, and the pressure drop is raised by 250 Pa. The dust holding capacity may sometimes simply be referred to as the dust holding capacity in the description hereafter.

A comparison of the dust holding capacity of the first porous film 31 and the dust holding capacity of the second porous film 32 can be performed using the average value of the dust holding capacity measured for 10 to 50 locations of one porous film, for example. The dust holding capacity at each measured location is measured according to the manner described below using polyalphaolefin particles. There is no particular limitation, but the dust holding capacity of the first porous film 31 is 25 g/m$^2$ or greater and 35 g/m$^2$ or less, for example.

In the filter medium 1 of the present embodiment, the pressure drop of the first porous film 31 and the pressure drop of the second porous film 32 may be the same or different, but from the perspective of increasing the dust holding capacity while maintaining the property of having low pressure drop and high collection efficiency, it is preferable that the pressure drop of the first porous film 31 be smaller than the pressure drop of the second porous film 32.

Also, the collection efficiency of the first porous film 31 and the collection efficiency of the second porous film 32 can be the same or different, but from the perspective of increasing the dust holding capacity while maintaining the property of having low pressure drop and high collection efficiency, it is preferable that the collection efficiency of the second porous film 32 be higher than the collection efficiency of the first porous film 31.

Thus, by having the pressure drop of the first porous film 31 be smaller than the pressure drop of the second porous film 32, and having the collection efficiency of the second porous film 32 be higher than the collection efficiency of the first porous film 31, at the first porous film 31 of the upstream side, it is possible to allow microparticles to pass through to some degree to the downstream side without being excessively collected. Furthermore, sufficient collecting can be performed at the second porous film 32 of the downstream side. By doing this, it is possible to perform collecting across a broad area in the thickness direction of the filter medium 1, and suppress the occurrence of premature clogging at the upstream side layer.

Pressure drop means the pressure drop when air is passed through at a flow rate of 5.3 cm/s, and with the description hereafter, may also be referred to simply as pressure drop.

Except in cases when specifically indicated otherwise, collection efficiency means the collection efficiency for particles when air containing NaCl particles having a particle diameter of 0.3 μm is passed through at a flow rate of 5.3 cm/s, and in the description hereafter may be referred to as simply the collection efficiency.

The comparison of the pressure drop of the first porous film 31 and the pressure drop of the second porous film 32 can be performed using the average value of the pressure drop measured at 10 to 50 locations of one porous film, for example. The pressure drop at each measured location is measured according to the manner described below. The size of the difference between the pressure drop of the first porous film 31 and the pressure drop of the second porous film 32 is not particularly limited, and can be 10 Pa or greater and 130 Pa or less, for example. Also, though not particularly limited, the pressure drop of the first porous film 31 can be 30 Pa or greater and 90 Pa or less, or can be 40 Pa or greater and 80 Pa or less. The pressure drop of the second porous film 32 can be 40 Pa or greater and 160 Pa or less, or can also be 50 Pa or greater and 100 Pa or less.

The comparison of the collection efficiency of the first porous film 31 and the collection efficiency of the second porous film 32 can be performed using the average value of the collection efficiency measured at 10 to 50 locations of one porous film, for example. The collection efficiency at each measured location is measured using NaCl particles having a particle diameter of 0.3 μm according to the manner described below. Though not particularly limited, the collection efficiency of the first porous film 31 is, for example, 95% or greater and 99% or less, and the collection efficiency of the second porous film 32 is, for example, 99% or greater and 99.99% or less.

As described above, the reason that the dust holding capacity is increased by having a different upstream-side first porous film 31 and downstream-side second porous film 32 is presumably because microparticles are allowed to flow to the downstream side by the average pore diameter being broader for the first porous film 31 than the second porous film 32. Specifically, it is thought that, by having the average pore diameter of the first porous film 31, which is the upstream side layer, be greater, yielding a lower-fineness configuration (in specific terms, the average pore diameter is 3.0 μm or greater and 3.9 μm or less), microparticles are allowed to pass through in the depth (thickness) direction of the filter medium 1, and collecting is performed in a broader range in the thickness direction of the filter medium 1; as a result, the dust holding capacity increases. In particular, when using the first porous film 31 and the second porous film 32 fabricated using the three types of components noted above, it is possible to ensure an area in the thickness direction for which collecting is possible, in order to gain thickness, and the dust holding capacity is presumed to increase as a result.

The first porous film 31 and the second porous film 32 are fabricated, for example, according to a method of fabricating porous films included in the method for producing a filter medium for an air filter described hereafter.

(3) Air-Permeable Support Member

The upstream air-permeable support member 21 is arranged at the upstream side of the first porous film 31 and supports the first porous film 31. Therefore, even if the first porous film 31, due to being very thin, etc., tends not to be self-supported, the first porous film 31 can be made to stand by the support of the upstream air-permeable support member 21.

The downstream air-permeable support member 22 is arranged at the downstream side of the second porous film 32, and supports the second porous film 32. The downstream air-permeable support member 22 is arranged so as to configure the furthest downstream side layer of the filter medium 1. Similarly, even if the second porous film 32, due to being very thin, etc., tends not to be self-supported, the second porous film 32 can be made to stand by the support of the downstream air-permeable support member 22.

There are no particular limitations as to the material or structure of the upstream air permeable support member 21 and the downstream air-permeable support member 22; examples include nonwovens, wovens, metal meshes, resin meshes, etc. Of these, nonwovens having thermal fusing properties are preferred from the perspective of strength, collecting ability, flexibility, and operability. The nonwoven is preferably one in which all or a portion of the constituent fibers have a core/sheath structure; a two-layer nonwoven composed of two layers, i.e., a layer of fibers of a low-melt material and a layer of fibers of a high-melt material; or a nonwoven coated on the surface with a thermal-fusing resin. As this kind of nonwoven, spun-bonded nonwovens can be cited. In nonwovens of core/sheath structure, the core component preferably has a higher melting point than the sheath component. For example, as core/sheath material combinations, there may be cited, e.g., PET/PE, or high-melt polyester/low-melt polyester. As low-melt material/high-melt material combinations in two-layer nonwovens, there may be cited, for example, PE/PET, PP/PET, PBT/PET, and low-melt PET/high-melt PET. As nonwovens coated on the surface with a thermal-fusing resin, there may be cited, for example, PET nonwoven coated with EVA (ethylene vinyl acetate copolymer resin), or PET nonwoven coated with an olefin resin.

There are no particular limitations as to the material of the nonwoven, and polyolefins (PE, PP, etc.), polyamides, polyesters (PET, etc.), aromatic polyamides, composite materials of these, etc. can be used.

The upstream air-permeable support member 21 can be joined to the first porous film 31 through partial melting of the upstream air-permeable support member 21 induced by heat, or by melting of a hot-melt resin, utilizing an anchor effect, or utilizing adhesion by a reactive adhesive, etc. The downstream air-permeable support member 22 can be joined to the second porous film 32 in the same manner.

The upstream air-permeable support member 21 and the downstream air-permeable support member 22 can be the same type of item or can be a different type of item.

When either of the upstream air-permeable support member 21 and the downstream air-permeable support member 22 is compared to the porous films described above, the pressure drop, collection efficiency, and dust holding capacity can all be extremely low, and can be items regarded as substantially as 0.

The pressure drop of the upstream air-permeable support member 21 and of the downstream air-permeable support member 22 are preferably both 10 Pa or less, more preferably 5 Pa or less, and even more preferably 1 Pa or less.

Also, the collection efficiency at which each of the upstream air-permeable support member 21 and of the downstream air-permeable support member 22 collect NaCl particles having a particle diameter of 0.3 µm can both be items that are substantially 0 or regarded as roughly 0, for example.

Also, the thickness for both the upstream air-permeable support member 21 and the downstream air-permeable support member 22 is preferably 0.3 mm or less, and more preferably 0.25 mm or less.

Also, the each basis weight of both the upstream air-permeable support member 21 and the downstream air-permeable support member 22 is preferably 20 g/m$^2$ or greater and 50 g/m$^2$ or less.

(4) Pre-Collection Member

The pre-collection member 10 is arranged further to the upstream side than the first porous film 31 (in the present embodiment, the upstream side of the upstream air-permeable support member 21), and is able to collect a portion of dust in the air current.

The pre-collection member 10 has a pressure drop of 15 Pa or greater and less than 55 Pa, a collection efficiency of 25% or greater and less than 80%, a thickness of 0.4 mm or less, and a PF value of 7 or greater and 15 or less.

The pre-collection member 10 is not particularly limited, but it is preferable that this be a nonwoven or fiber layered structure configured using a fiber material manufactured using a melt-blowing method, an electro-spinning method, a sea-island method, or a hybrid method of these. The hybrid method includes a melt spinning method or an electro-blowing method, for example. The sea-island method, for example, is a method whereby when a fiber is configured by discharging from a plurality of discharge ports, a difference in the starting material is provided according to the discharge passage, and the sea part is configured using a portion of the starting materials, and the island part is configured using other different starting materials such that the cross section has a sea-island structure. Here, a polymer is spun from the two sea/island components or a plurality of components, and by melting the sea-components with a later process, it is possible to have a fiber for which the island part remains. By combining the starting materials using the discharge passage, it is possible to adjust the bulk density, the stretchability, etc.

With melt-blowing, while discharging melted polymer from a nozzle using an extruder, filaments are formed by discharging so that heated air follows the nozzle. Here, by adjusting the polymer discharge volume per unit of time from the nozzle, or the blowing speed of the heated air, etc., it is possible to obtain a thiner diameter filament. Also, the physical properties of that filament can be modified by the melt viscosity of the used polymer.

The pressure drop of the pre-collection member 10, from the perspective of keeping the pressure drop of the overall filter medium 1 low, is 15 Pa or greater and less than 55 Pa.

The dust collection efficiency of the pre-collection member 10 is 25% or greater and less than 80%, and more preferably 40% or greater and less than 80%. When the collection efficiency of the pre-collection member 10 is too low, the collecting load of the first porous film 31 and/or the second porous film 32 becomes high, and clogging by dust occurs prematurely. Also, when the collection efficiency of the pre-collection member 10 is too high, clogging of the pre-collection member 10 itself cannot be ignored, and ultimately clogging occurs prematurely.

The thickness of the pre-collection member 10 is 0.4 mm or less, for example. When the thickness of the pre-collection member 10 exceeds 0.4 mm, the pressure drop due to the structure of an air filter unit 60 (structural resistance) becomes large.

From the perspective of having a good balance between the collection efficiency of the pre-collection member 10 to suppress the collecting load on the first porous film 31 and/or the second porous film 32, and the pressure drop of the pre-collection member 10 to suppress pressure drop of the overall filter medium, while increasing the dust holding capacity of the overall filter medium, the PF value of the pre-collection member 10 is 7 or greater and 15 or less, and more preferably 7 or greater and 13 or less. Here, the PF value is found using the formula below.

PF value={−log((100−collection efficiency (%))/100)}/(pressure drop (Pa)/1000)

The properties of the fiber material of the pre-collection member 10 are not particularly limited; examples include polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), polyurethane (PU), combinations of these, etc.

The average fiber diameter for the nonwoven fiber or fiber layer structure of the pre-collection member 10 is preferably 0.8 μm or greater and less than 2.0 μm. When the average fiber diameter is less than 0.8 μm, the collection efficiency rises, but because the fiber is arranged densely, there is a great rise in pressure drop for the pre-collection member 10. On the other hand, when the average fiber diameter is 2 μm or greater, and the basis weight is increased to maintain the collection efficiency, the thickness of the pre-collection member 10 increases, and the pressure drop with the pre-collection member 10 rises. In this case, it is preferable that the basis weight be 5 g/m² or greater and 50 g/m² or less, for example. When the fiber diameter is too small, the fiber interval becomes tighter, and clogging of the pre-collection member will need to be addressed, while if the fiber diameter is too large, the collection efficiency per fiber unit decreases, so the basis weight and thickness to obtain the necessary collection efficiency for the pre-collection member 10 increase, and the structural resistance becomes higher, which is undesirable.

Also, when the pre-collection member 10 is the abovementioned nonwoven material, the geometric standard deviation indicating expansion of the fiber diameter distribution is preferably 2.5 or less, and more preferably 2.0 or less. This is because if the geometric standard deviation is too large, the collection efficiency per fiber unit is low and the fiber ratio increases, making it necessary to increase the basis weight and thickness to obtain the necessary collection efficiency for the pre-collection member.

The average fiber diameter is determined as described hereafter. First, an image is taken of the surface of a test sample at a magnification of 1000 to 5000 using a scanning electron microscope (SEM), two orthogonal lines are drawn on one taken image, and the thickness of the image of the fiber intersecting with these lines is obtained as the fiber diameter. Here, the number of fibers measured is 200 or more. For the fiber diameter obtained in this way, a log-normal plot is made with the fiber diameter used for the horizontal axis and the cumulative frequency used for the vertical axis, and the value for which the cumulative frequency is 50% is used as the average fiber diameter. The geometric standard deviation expressing the fiber diameter distribution, as a result of the log-normal plot described above, is calculated from the formula noted hereafter reading the fiber diameter at cumulative frequency 50% and the fiber diameter at cumulative frequency 84%.

Geometric standard deviation [−]=Cumulative frequency 84% fiber diameter/Cumulative frequency 50% fiber diameter (5) Overall Filter Medium The value of the "the PF value of the pre-collection member 10/the PF value when the first porous film 31 and the second porous film 32 are overlapped," which is the ratio of the PF value of the pre-collection member 10 to the PF value when the first porous film 31 and the second porous film 32 are overlapped, is 0.20 or greater and 0.45 or less, and more preferably 0.20 or greater and 0.38 or less. For the filter medium 1 overall, by having the relationship of the pre-collection member 10 with the first porous film 31 and the second porous film 32 be in the applicable range, it is possible to collect dust with the pre-collection member 10 at a level for which clogging will not occur prematurely with the pre-collection member 10, it is possible to suitably lighten the collecting load on the downstream side first porous film 31 and/or the second porous film 32, enabling collecting more dust in a broad area in the thickness direction.

Here, the PF value in a state with the upstream air-permeable support member 21, the first porous film 31, the second porous film 32, and the downstream air-permeable support member 22 overlapped is substantially equivalent to the PF value in a state with the first porous film 31 and the second porous film 32 overlapped. This is because the upstream air-permeable support member 21 and the downstream air-permeable support member 22 do not substantially contribute to the pressure drop and collection efficiency.

Also, the pressure drop of the filter medium 1 is preferably less than 200 Pa, and more preferably 70 Pa or greater and 195 Pa or less. By keeping the pressure drop of the filter medium 1 within this range, it is kept lower than a HEPA filter composed of a glass filter medium.

The collection efficiency of the filter medium 1 is preferably 99.97% or greater. A filter medium satisfying this kind of collection efficiency can be used as a HEPA grade filter.

The dust holding capacity of the filter medium 1 is preferably 40 g/m² or greater. The filter medium 1 of the present embodiment is able to significantly increase the dust holding capacity (at the same level or greater as the dust holding capacity of a glass filter medium) while keeping the balance of the collection efficiency and the pressure drop at a high level.

With the filter medium 1 of the present embodiment, provided are a first porous film 31, a second porous film 32, and a pre-collection member 10 for which the pressure drop of the filter medium 1 overall is less than 200 Pa, and it is possible to increase the dust holding capacity to 40 g/m² or greater while maintaining the physical property of the collection efficiency being 99.97% or greater.

(6) Modifications (6-1)

Figure 2:
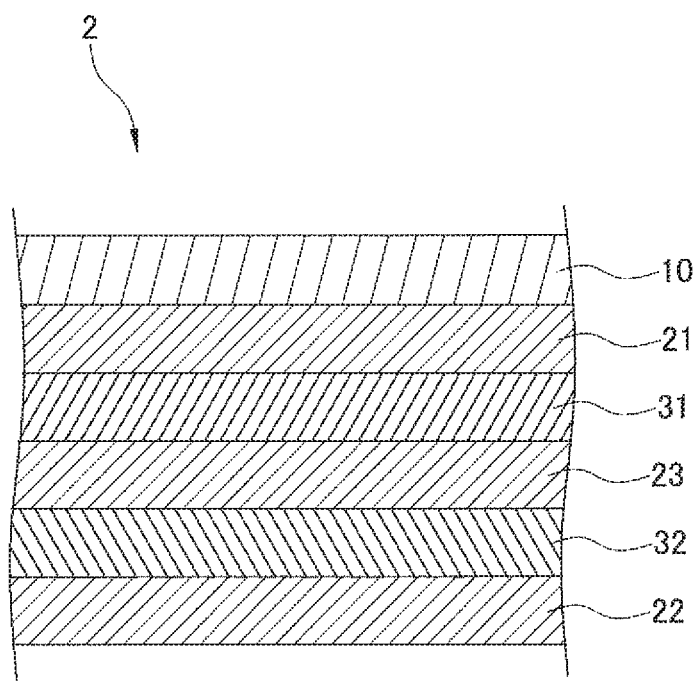
FIG. 2 is a schematic cross sectional view of the layer configuration of a 6-layer structure filter medium of a modification.

There follows a description of a modification of the filter medium for an air filter 1 of the present embodiment with reference to FIG. 2.

With the abovementioned filter medium for an air filter 1, a description was given of an example of a 5-layer structure filter medium for which the pre-collection member 10, any upstream air-permeable support member 21, the first porous film 31, the second porous film 32, and a desired downstream air-permeable support member 22 are provided in order from the upstream side in the air current.

In contrast to this, it is also possible to use a 6-layer structure filter medium for an air filter 2 such as that shown in FIG. 2, for example.

As with the filter medium for an air filter 1, the filter medium for an air filter 2 is provided with the pre-collection member 10, any upstream air-permeable support member 21, the first porous film 31, the second porous film 32, and any downstream air-permeable support member 22 in order from the upstream side in the air current. Further provided between the first porous film 31 and the second porous film 32 is a desired midstream air-permeable support member 23.

In this filter medium for an air filter 2, the pre-collection member 10, the upstream air-permeable support member 21, the first porous film 31, the second porous film 32, and the downstream air-permeable support member 22 are all the same as those of the abovementioned filter medium for an air filter 1.

As the midstream air-permeable support member 23, it is possible to use the member described in the air-permeable support member section in the same way as the above described upstream air-permeable support member 21 and the downstream air-permeable support member 22. The upstream air-permeable support member 21, the downstream air-permeable support member 22, and the midstream air-permeable support member 23 can be the same type of member, or can be different types of members.

Even with the configuration of this filter medium for an air filter 2, as with the abovementioned filter medium for an air filter 1, it is possible to increase the dust holding capacity to 40 g/m$^2$ or greater while maintaining the physical properties of the pressure drop being less than 200 Pa and the collection efficiency being 99.97% or greater.

With the filter medium for an air filter 1 and the filter medium for an air filter 2, there were described examples when the number of porous films used was two. However, the invention is not limited to this; three or more can be used. In this case, it is preferable that the plurality of porous films be arranged such that the size of the pressure drop decreases in order from the downstream side in the air current to the upstream side.

(6-2)

With the abovementioned filter medium for an air filter 1, there was described an example of a 5-layer structure filter medium provided with, in order from the upstream side of the air stream, the pre-collection member 10, any upstream air-permeable support member 21, the first porous film 31, the second porous film 32, and any downstream air-permeable support member 22.

Figure 3:
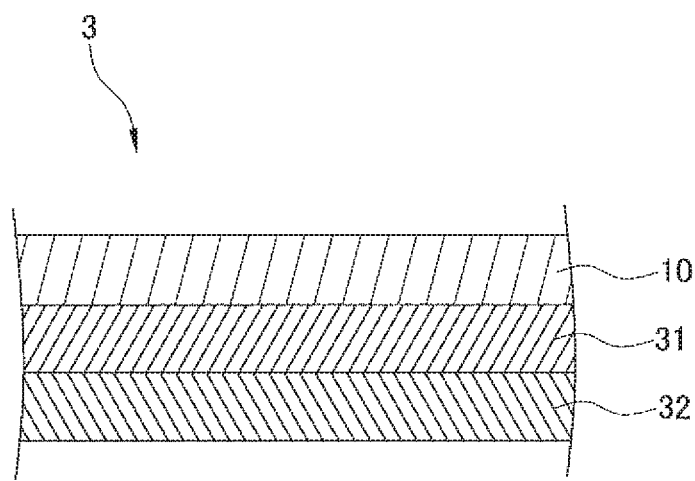
FIG. 3 is a schematic cross sectional view of the layer configuration of a 3-layer structure filter medium of a modification.

In contrast to this, it is also possible to use a 3-layer structure filter medium for an air filter 3 such as shown in FIG. 3, for example.

The filter medium for an air filter 3, as with the filter medium for an air filter 1, is provided with the pre-collection member 10, the first porous film 31, and the second porous film 32.

With this filter medium for an air filter 3, the pre-collection member 10, the first porous film 31, and the second porous film 32 are all the same as those of the abovementioned filter medium for an air filter 1.

Compared to the abovementioned filter medium for an air filter 1, the filter medium for an air filter 3, in not being provided with any upstream air-permeable support member 21 or any downstream air-permeable support member 22, has weaker strength, and has a structure that is not easily self supported, but there are cases when strength is not required depending on the used location structure and/or installation environment, so it is possible to use this as the filter medium for an air filter.

With this filter medium for an air filter 3 configuration as well, the same as with the abovementioned filter medium for an air filter 1, it is possible to increase the dust holding capacity to 40 g/m$^2$ or greater while maintaining the physical properties of the pressure drop being less than 200 Pa and the collection efficiency being 99.97% or greater.

With the filter medium for an air filter 3 as well, the number of porous films used is not limited to two; three or more can also be used. In this case, it is preferable that the plurality of porous films be arranged so as to have the size of the pressure drop be smaller in order from the downstream side to the upstream side in the air current.

(7) Examples of Usage

The filter medium for an air filter may be employed in usage such as the following, for example.

Fields such as ULPA filters (Ultra low Penetration Air Filter) (for semiconductor manufacture), HEPA filters (for hospitals, semiconductor manufacture), cylindrical cartridge filters (for industrial use), bag filters (for industrial use), heat-resistant bag filters (for exhaust gas treatment), heat-resistant pleated filters (for exhaust gas treatment), SIN-BRAN (a registered trademark) filters (for industrial use), catalytic filters (for exhaust gas treatment), filters containing adsorbents (for assembly in hard disk drives (HDD)), vent filters containing adsorbents (for assembly in HDDs), vent filters (for assembly in HDDs, etc.), vacuum cleaner filters (for vacuum cleaners), general purpose multilayer felt materials, gas turbine cartridge filters (gas turbine compatible parts), cleaning filters (for use in electronic device housings), etc.;

ventilation/internal pressure regulation fields, such as materials for freeze drying use in containers for freeze drying use, automotive ventilation materials for electronic circuits and/or lamps, container usages such as container caps, protective ventilation usages for electronic equipment, and medical ventilation applications; and liquid filtration fields such as semiconductor liquid filtration filters (for semiconductor manufacture), hydrophilic filters (for semiconductor manufacture), filters for chemical products (chemical solution treatment), filters for purified water manufacturing lines (purified water manufacture), backwashing liquid filtration filters (for industrial effluent treatment), etc.

(8) Filter Pack

Figure 4:
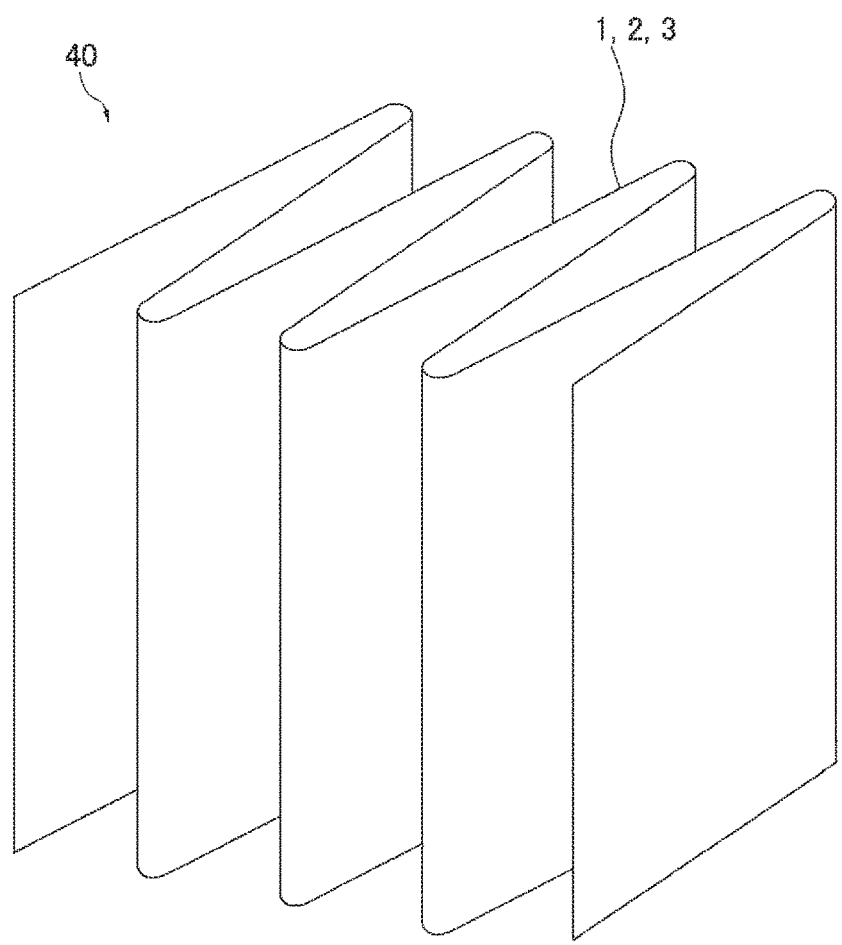
FIG. 4 is an external perspective view of a filter pack of the present embodiment.

There follows a description of the filter pack of the present embodiment with reference to FIG. 4.

FIG. 4 is an external perspective view of a filter pack 40 of the present embodiment.

The filter pack 40 is provided with the filter medium for an air filter described above (the filter medium for an air filter 1 and/or the filter medium for an air filter 2, etc., for example). The filter medium for an air filter of the filter pack 40 is a processed filter medium processed into a zigzag configuration produced by alternately repeating mountain folds and valley folds (pleating process). The pleating process can be carried out, for example, by a rotary folding machine. The filter medium fold width is not particularly limited, but can be 25 mm or greater and 280 mm or less, for example. By having the pleating process implemented, it is possible for the filter pack 40 to have the filter medium fold surface increased easily when used for the air filter unit, thus making it possible to obtain an air filter unit with high collection efficiency.

The filter pack 40, in addition to the filter medium, may also be further provided with a spacer (not illustrated) for holding the pleating space when used for the air filter unit. Though the material of the spacer is not specifically limited, a hot-melt resin may be preferably used.

(9) Air Filter Unit

Next, an air filter unit 60 will be described, with reference to FIG. 5.

Figure 5:
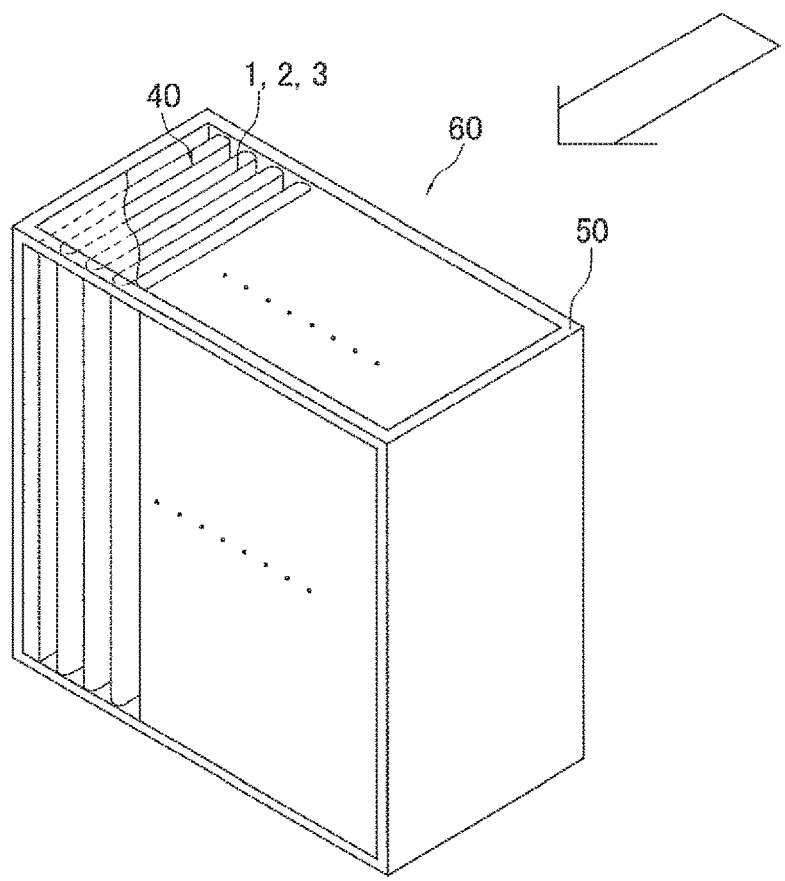
FIG. 5 is an external perspective view of an air filter unit of the present embodiment.

FIG. 5 is an external perspective view of an air filter unit 60 of the present embodiment.

The air filter unit 60 is provided with the filter medium for an air filter or the air pack described above, and a frame 50 to hold the filter medium for an air filter or the filter pack. Said another way, the air filter unit can be fabricated so as to hold the filter medium in the frame, or can be fabricated so as to hold the filter pack 40 in the frame 50. The air filter unit 60 show in FIG. 5 is fabricated using the filter pack 40 and the frame 50.

The frame 50 is made by assembling panels together or by molding resin, for example, and between the filter pack 40 and the frame 50 is preferably sealed using a gear sealant. As the sealant, which is for preventing leak between the filter pack 40 and the frame 50, ones made, for example, of epoxy, acrylic, urethane, or other resins may be used.

The air filter unit 60 provided with the filter pack 40 and the frame 50 can be a mini-pleat type air filter unit held so that one filter pack 40 extending in flat plane form is housed inside the frame 50, or can also be a V-bank type air filter unit or a single header type air filter unit for which a plurality of filter packs extending in flat plane form are aligned held in the frame.

On the other hand, the air filter unit provided with the filter medium and the frame can also be a separator type air filter unit for which the filter medium is in an alternately folded wave shape, and for which a separator that has undergone corrugation processing, for example, is arranged in the valley parts of the filter medium formed by alternately folding.

(10) Method For Producing a Filter Medium For an Air Filter

There follows a description of the method for producing the filter medium for an air filter of the present embodiment.

The method for producing a filter medium of the present embodiment is a method for producing a filter medium for an air filter to collect dust in a gas that includes:

(a) a step to obtain a first porous film and a second porous film mainly containing a fluororesin, (b) a step to arrange the first porous film further to the upstream side in the air current than the second porous film, and (c) a step to arrange a pre-collection member to collect a portion of the dust in the air current further to the upstream side in the air current than the first porous film, wherein the pre-collection member has the pressure drop when the air is passed through at a flow rate of 5.3 cm/s of 15 Pa or greater and less than 55 Pa, the collection efficiency of NaCl particles having a particle diameter of 0.3 µm of 25% or greater and less than 80%, the thickness of 0.4 mm or less, and the PF value found with the following formula: PF value=$\{-\log((100-\text{collection efficiency (\%)})/100)\}/$(pressure drop (Pa)/1000) of 7 or greater and 15 or less, the value of "the PF value of the pre-collection member/the PF value when the first porous film and the second porous film are overlapped," which is the ratio of the PF value of the pre-collection member to the PF value when the first porous film and the second porous film are overlapped, is 0.20 or greater and 0.45 or less, and further provided is a step of integrating the first porous film, the second porous film, and the pre-collection member by heat lamination.

The fluororesin used in step (a) can be the same one used for the filter medium for an air filter described above. The first porous film and the second porous film can further contain other components that are different from the fluororesin.

The abovementioned PF value of the pre-collection member is preferably 7 or greater and 13 or less.

It is also possible to further provide a step (d) of arranging the upstream air-permeable support member to support the first porous film further to the upstream side in the air current than the first porous film. It is also possible to further provide a step of integrating the first porous film, the second porous film, the upstream air-permeable support member, and the pre-collection member by heat lamination.

It is also possible to further provide a step (e) of arranging the downstream air-permeable support member to support the second porous film further to the downstream side in the air current than the second porous film. It is also possible to further provide a step of integrating the first porous film, the second porous film, the downstream air-permeable support member, and the pre-collection member by heat lamination.

In addition, it is also possible to further provide the abovementioned steps (d) and (e), and to further provide a step of integrating the first porous film, the second porous film, the upstream air-permeable support member, the downstream air-permeable support member, and the pre-collection member by heat lamination.

Here, at step (a), a description is provided citing an example of a method for producing the first porous film and the second porous film using the three types of components described above.

The form of the three components A to C described above is not particularly limited; the following composition, powder mixture, and molding material may be used. First, there follows a description of the composition, the powder mixture, and the molding material which are starting materials of the porous film.

The composition, powder mixture, and molding material each include the aforedescribed component A, component B, and component C, the component C being contained at a level of 0.1 to less than 20 wt % of the total. The component A, component B, and component C are respectively the same as the fibril-forming PTFE, the non-fibril-forming non-melting-processable component, and the non-fibril-forming hot-melt-processable component discussed previously in relation to the porous film.

The molding material is, for example, a material for molding a porous film, intended for molding of a porous film to be employed as a filter medium for a filter used to collect microparticles in a gas.

The form of the starting materials for the porous film may be a powder mixture as described below; a non-powder mixture; or a molding material or composition as discussed below. As powder mixtures, there may be cited, for example, a fine powder obtained through co-coagulation as employed in the examples discussed below, a powder obtained by mixing of two of the three starting materials through co-coagulation and followed by mixing with the remaining one component in a mixer, or a powder obtained by mixing of the three starting materials with a mixer. As non-powder mixtures, there may be cited, for example, a molded article such as a porous body (e.g., a porous film), or an aqueous dispersion that includes the three components.

A molding material refers to one that has undergone adjustment for the purpose of processing in order to mold a composition, and could be, for example, a material to which a processing aid (a liquid lubricant, etc.), etc. has been added, one having undergone adjustment of the particle size, or one having undergone preliminary molding. The molding material may include, for example, known additives, etc., in addition to the aforedescribed three components. As known additives, there may be cited, for example, carbon nanotubes, carbon black, and other such carbon materials, pigments, photocatalysts, activated carbon, antimicrobial agents, adsorbents, deodorizers, etc.

The compositions can be manufactured by various methods; for example, in cases in which the composition is a powder mixture, manufacture may take place by a method of mixing a powder of the component A, a powder of the component B, and a powder of the component C, with an ordinary mixer, etc.; a method of co-coagulation of three aqueous dispersions respectively including the component A, component B, and component (C) (the aforedescribed step (a)) to obtain a co-coagulated powder; a method of preliminary co-coagulation of aqueous dispersions including any two of the component A, component B, and component C to obtain a mixed powder, which is mixed with a powder of the remaining one component in an ordinary mixer, etc. With these methods, suitable stretched materials can be obtained regardless of the producing process. Among these, from the perspective of ease of uniform dispersion of the three different components, a composition obtained through co-coagulation of three aqueous dispersions respectively including the component A, component B, and component (C) is preferred.

There are no particular limitations as to the size of the powder mixture obtained through co-coagulation, and average particle size is, for example, 100-1,000 μm, and preferably 300-800 μm. In this case, average particle size is measured in accordance with JIS K6891. There are no particular limitations as to the apparent density of the powder mixture obtained through co-coagulation, which is, for example, 0.40-0.60 g/mL, and preferably 0.45-0.55 g/mL. The apparent density is measured in accordance with JIS K6892.

As the aforedescribed co-coagulation methods, there may be cited, for example, (i) mixing an aqueous dispersion of component (A), an aqueous dispersion of component (B), and an aqueous dispersion of component (C), followed by coagulation;

(ii) adding, to an aqueous dispersion of any one component among component (A), component (B), and component (C), powders of the remaining two components, followed by coagulation;

(iii) adding a powder of any one component among component (A), component (B), and component (C), to a mixed aqueous dispersion obtained by mixing aqueous dispersions of the remaining two components, followed by coagulation; and (iv) pre-mixing aqueous dispersions of any two components among component (A), component (B), and component (C), followed by coagulation to obtain a mixed powder of the two components, which is added to an aqueous dispersion of the remaining one component, followed by coagulation.

As a method for the co-coagulation described above, in terms of easily having uniform dispersion of the three types of components, the method in the abovementioned (i) is preferable.

In co-coagulation by the aforedescribed methods of (i)-(iv), it is preferable to coagulate by adding, for example, any of nitric acid, hydrochloric acid, sulfuric acid, or other acids; magnesium chloride, calcium chloride, sodium chloride, aluminum sulfate, magnesium sulfate, barium sulfate, sodium bicarbonate, sodium carbonate, or other metal salts; or acetone, methanol, or other organic solvents.

There are no particular limitations as to the form of the component (A) prior to mixing, and an aqueous dispersion or powder of the aforementioned fibril-forming PTFE would be acceptable. As powders (in particular, the fine powders mentioned above), there may be cited the Mitsui-DuPont Fluorochemicals products TEFLON 6-J (TEFLON is a registered trademark), TEFLON 6C-J, TEFLON 62-J, etc.; the Daikin Industries products POLYFLON F106, POLYFLON F104, POLYFLON F201, POLYFLON F302, etc.; the Asahi Glass products FLUON CD123, FLUON CD1, FLUON CD141, FLUON CD145, etc., or the Dupont products TEFLON 60, TEFLON 60 X, TEFLON 601A, TEFLON 601 X, TEFLON 613A, TEFLON 613A X, TEFLON 605XT X, TEFLON 669 X, etc. The fine powders may be obtained by coagulation and drying of fibril-forming PTFE aqueous dispersion (freshly-polymerized aqueous dispersion) obtained by emulsion polymerization of TFE.

The aqueous dispersion of fibril-forming PTFE may be a freshly-polymerized aqueous dispersion as described above, or a commercially available aqueous dispersion. As a preferred method for preparation of a freshly-polymerized, fibril-forming PTFE aqueous dispersion, there may be cited the preparation methods disclosed in the aforementioned patent publications cited as examples disclosing homo-PTFE. As commercially available aqueous dispersions of fibril-forming PTFE, there may be cited aqueous dispersions of the Daikin Industries products POLYFLON D-110, POLYFLON D-210, POLYFLON D-210C, POLYFLON D-310, etc.; the Mitsui-Dupont Fluorochemicals products TEFLON 31-JR, TEFLON 34-JR, etc.; and the Asahi Glass products FLUON AD911L, FLUON AD912L, AD938L, etc. In any of the commercially available aqueous dispersions of fibril-forming PTFE, nonionic surfactants, etc. are added at levels of 2-10 weight parts per 100 weight parts of PTFE in the aqueous dispersion in order to maintain stability, and therefore the nonionic surfactants tend to remain in the mixed powder obtained by co-coagulation, posing a risk of problems such as discoloration of the porous body. For this reason, a freshly-polymerized aqueous dispersion is preferred as the aqueous dispersion of fibril-forming PTFE.

There are no particular limitations as to the form of the component (B) prior to mixing; and in cases where component B is a low-molecular weight PTFE, while there are no particular limitations as to the form prior to mixing, an aqueous dispersion would be acceptable, as would a powder (typically called a "PTFE micropowder" or "micropowder"). As low-molecular weight PTFE powders, there may be cited, for example, the Mitsui-Dupont Fluorochemicals product MP1300-J, etc.; the Daikin Industries products LUBRON L-5, LUBRON L-5F, etc.; the Asahi Glass products FLUON L169J, FLUON L170J, FLUON L172J, etc.; and the Kitamura products KTL-F, KTL-500F, etc.

The aqueous dispersion of low-molecular weight PTFE may be a freshly-polymerized aqueous dispersion obtained by emulsion polymerization of TFE as described above, or a commercially available aqueous dispersion. A micropowder dispersed in water using a surfactant, etc. can also be used. As preferred methods for preparation of a freshly-polymerized, fibril-forming PTFE aqueous dispersion, there may be cited the preparation methods disclosed in Japanese Laid-open Patent Publication No. H07-165828, Japanese Laid-open Patent Publication No. H10-147617, Japanese Laid-open Patent Publication No. 2006-063140, Japanese Laid-open Patent Publication No. 2009-1745, WO2009/020187, etc. As commercially available aqueous dispersions of fibril-forming PTFE, there may be cited aqueous dispersions of the Daikin Industries product LUBRON LDW-410, etc. In any of the commercially available low-molecular weight PTFE aqueous dispersions, nonionic surfactants, etc. are added at levels of 2-10 weight parts per 100 weight parts of PTFE in the aqueous dispersion in order to maintain stability, and therefore the nonionic surfactants tend to remain in the mixed powder obtained by co-coagulation, posing a risk of problems such as discoloration of the porous body. For this reason, a freshly-polymerized aqueous dispersion is preferred as the aqueous dispersion of fibril-forming PTFE.

In cases where an inorganic filler is employed as the component B, there are likewise no limitations as to the form thereof prior to mixing; however, an aqueous dispersion is preferred. As inorganic fillers, there may be cited TALC P2 made by Nippon Talc, LMR-100 made by Fuji Talc Industrial Co., etc. These may appropriately undergo surface treatment with a silane coupling agent, etc., and the powder is dispersed in water for use. Among these, a secondary-milled product (TALC P2, etc.) produced by a jet mill is preferred in terms of improved dispersibility in water.

As the component C, besides fluororesins such as FEP and PFA, various resins such acrylic, urethane, or PET resins for example, may be cited. While there are no limitations as to the form thereof prior to mixing, an aqueous dispersion is preferred. As the aqueous dispersion, the freshly-polymerized dispersion may be used without further modification in the case of a resin obtained by emulsion polymerization and a resin powder dispersed into the aqueous component by a surfactant, etc. may also be used. The aqueous dispersion is prepared by dispersing a prescribed amount of component C into water, such that the content thereof in the porous film is 0.1 to less than 20 wt %.

There are no limitations as to the method for co-coagulation, but in preferred practice, three aqueous dispersions are mixed, then subjected to mechanical stirring force.

Co-coagulation is followed by dewatering and drying, a liquid lubricant (extrusion aid) is admixed, and extrusion is carried out. There are no limitations as to the liquid lubricant, which may be any substance capable of wetting the surfaces of the PTFE powder, and of being eliminated after the mixture obtained through co-coagulation has been molded into a film profile. For example, liquid paraffin, naphtha, white oil, toluene, xylene, or other hydrocarbon oils, alcohols, ketones, esters, etc. may be cited.

A film profile is molded by mixing a liquid lubricant into the mixture obtained through co-coagulation, then extruding and rolling the material by conventional known methods. Extrusion may be carried out by paste extrusion, ram extrusion, etc., and preferably carried out by paste extrusion. The extruded sheet profile extruded by paste extrusion is rolled under heating, e.g., under temperature conditions of 40° C.-80° C., using a calender roll, etc. The thickness of the rolled film profile obtained thereby is set on the basis of the target thickness of the porous film, but is ordinarily 100-400 μm.

Next, the liquid lubricant is eliminated from the rolled, unbaked film. Elimination of the liquid lubricant may be carried out by a heating process or extraction process, or a combination of these. In the case of a heating process, there are no particular limitations as to the heating temperature, provided it is lower than the melting point of the non-fibril-forming hot-melt-proces sable component, e.g., 100-250° C.

The rolled material from which the liquid lubricant has been eliminated is stretched at a temperature not lower than the melting point of the non-fibril-forming hot-melt-processable component, and not higher than the decomposition temperature of the non-fibril-forming non-melting-processable component. In the process, the non-fibril-forming hot-melt-processable component melts, and subsequently solidifies in the nodes, thereby reinforcing the strength of the porous film in the thickness direction. The stretching temperature at this time may be set by the temperature of the furnace where stretching is carried out, or by the temperature of heated rollers that convey the rolled material, or through a combination of these settings.

Stretching includes stretching in a first direction, and preferably also stretching in a second direction orthogonal to the first direction. In cases in which the porous film will be employed as an embossed filter medium for an air filter, it is preferable for stretching to be conducted in a second direction as well. In the present embodiment, the first direction is the lengthwise direction (longitudinal direction) of the rolled material, and the second direction is the width direction (traverse direction) of the rolled material.

The rolled material is stretched at an elongation area ratio of 40-800. The stretching rate in the first direction is preferably 10-600%/sec, and more preferably 10-150%/sec. The temperature during stretching is preferably 200-350° C., and more preferably 280-310° C.

The stretching rate in the second direction is preferably 10-600%/sec. The temperature during stretching is preferably 200-400° C., and more preferably 250-350° C. Stretching in the second direction may be conducted simultaneously with stretching in the first direction, or separately.

In relation to stretching of the rolled material (also referred to as an "unbaked fluororesin material"), it is known that the temperature during stretching, the stretching ratio, and the stretching rate influence the physical properties of the stretched material. The S-S curve (graph showing the relationship of elongation and tensile force in tension) of the unbaked fluororesin material shows unique characteristics that are different from other resins. Normally, a resin material experiences a rise in tensile force in tension in association with elongation. Parameters such as the range of the elastic area, the rupture point, etc. differ depending on the material and the evaluation conditions, but it is exceedingly common for the tensile force in tension to exhibit a tendency to rise in association with the amount of elongation. In contrast to this, with an unbaked fluororesin material, the tensile force in tension, after reaching a peak at a given amount of elongation, exhibits a tendency of gradual decrease. This fact indicates that there is an "area in which the unstretched region is stronger than the stretched region" in the unbaked fluororesin material.

Considering this fact as behavior during stretching, in the case of an ordinary resin, during stretching, the weakest section within the stretching plane begins to stretch, and as the stretched section becomes stronger than the unstretched section, the next-weakest unstretched section is stretched, and the stretched area expands, leading to stretching overall. In the case of an unbaked fluororesin material, on the other hand, when a section beginning to elongate reaches the aforementioned "area in which the unstretched region is stronger than the stretched region," the previously elongated section is stretched further, as a result of which the unstretched section remains in the form of a node (unstretched portion). When the stretching rate becomes slower, this phenomenon is more pronounced, and larger nodes (unstretched portions) remain. This phenomenon may be utilized during stretching to make adjustments to the physical properties of the stretched material, for various applications.

In the present embodiment, it is preferable to obtain a stretched material of lower density, and to do so it is effective to apply a low stretching rate, particularly during first stretching. In cases in which it is desired to obtain a molded material having a low filling rate and in which large nodes (unstretched portions) remain, and conventional PTFE alone has been selected as the starting material, it is necessary for the stretching rate to be no more than 150%/ sec, preferably not more than 80%/sec, in the first direction and stretching rate to be not more than 500%/sec in the second direction. However, the filling rate structure of molded materials obtained in this manner is easily impaired by external forces.

In the present embodiment, due to the presence of the non-fibril-forming non-melting-processable component, the aforedescribed phenomenon is more pronounced at low stretching rates. As a result, the stretching rate range that can be applied can be expanded to a stretching rate of not more than 600%/sec, preferably not more than 150%/sec, in the first direction, and a stretching rate of not more than 600%/sec in the second direction. Due to the presence of the non-fibril-forming hot-melt-processable component, the structure can be maintained even after post-processing.

The porous film obtained in this manner is preferably subjected to heat setting to obtain good mechanical strength and dimensional stability. The temperature during heat setting may be at or higher than the PTFE melting point or less than the PTFE melting point, and preferably 250-400° C.

When fabricating the PTFE porous film as the porous film, known methods can be used.

When obtaining the second porous film with different physical properties from those of the first porous film, by modifying the volume of liquid lubricant in relation to 100 weight parts of fluororesin to be lower when fabricating the second porous film than when fabricating the first porous film, it is possible to make the average pore diameter of the obtained porous film smaller, and obtain a second porous film which has greater pressure drop than the first porous film, and higher collection efficiency than the first porous film. In this case, the difference in the amount of liquid lubricant in relation to 100 weight parts of fluororesin (liquid lubricant volume difference or aid volume difference) is preferably 1 part by weight or greater and 4 weight parts or less. By the aid volume difference being 1 part by weight or greater, it is possible to generate a suitable average pore diameter difference between two porous films. By the fact that the aid volume difference is 4 weight parts or less, it is possible to suppress degradation of the stretching uniformity. Stretching uniformity means that with the porous films produced using the stretching process, there is little variation in characteristics such as the collection efficiency, pressure drop, etc., and these characteristics are uniform across the overall porous film. The liquid lubricant amount difference can be 2 weight parts, for example.

The volumes of the liquid lubricant used during fabrication of the first porous film and during fabrication of the second porous film are each preferably 30 weight parts or greater and 37 weight parts or less in relation to fluororesin 100 weight parts. By using 30 weight parts or more, it is possible to lower the pressure drop, and possible to have overall filter medium pressure drop of less than 200 Pa. Also, by using 37 weight parts or less, it is possible to ensure moldability of the raw tape described later, possible to inhibit the pore diameter of the first porous film from becoming too large so that microparticles are not collected and pass through flowing to the downstream side, and therefore possible to inhibit the load on the downstream-side second porous film.

In particular, it is preferable that the amount of liquid lubricant used during fabrication of the first porous film be, for example, 34 to 36 weight parts in relation to fluororesin 100 weight parts. For example, in a range in which the liquid lubricant amount difference satisfies 1 to 4 weight parts, by using 34 to less than 36 weight parts to fabricate the first porous film in contrast to using 31 to less than 34 weight parts to fabricate the second porous film, it is possible to significantly increase the dust holding capacity of the filter medium.

It is possible to fabricate the first porous film and the second porous film in a manner such that the unbaked film (hereinafter also referred to as raw tape) is fabricated by known methods followed by biaxial stretching.

Generating a difference in the average pore diameter of the two porous films can also be achieved by causing a difference in the blend ratio of the abovementioned three components between two porous films.

In relation to a pre-collection member which has the pressure drop of 15 Pa or greater and less than 55 Pa, the collection efficiency of 25% or greater and less than 80%, the thickness of 0.4 mm or less, and the PF value of 7 or greater and 15 or less, if there are sold the first porous film and the second porous film having physical properties capable of having the value of "the PF value of the pre-collection member/the PF value when the first porous film and the second porous film are overlapped" of 0.20 or greater and 0.45 or less, those porous films may also be obtained commercially.

The method of arranging the steps (b), (c), (d), and (e) is not particularly limited.

The step of integrating the first porous film, the second porous film, and the pre-collection member by doing heat lamination is not particularly limited. It is possible to integrate all of the first porous film, the second porous film, and the pre-collection member at one time by heat lamination, and it is also possible to integrate adjacent items to each other by heat lamination, and by repeating this, to integrate all of the first porous film, the second porous film, and the pre-collection member.

The step of integrating the first porous film, the second porous film, the upstream air-permeable support member, and the pre-collection member by heat lamination is not particularly limited, and rather than a case of integrating all of the first porous film, the second porous film, the upstream air-permeable support member, and the pre-collection member at one time by heat lamination, it is also possible to integrate adjacent items to each other by heat lamination, and by repeating this, to integrate all of the first porous film, the second porous film, the upstream air-permeable support member, and the pre-collection member.

Integration of the downstream air-permeable support member is the same as that of the upstream air-permeable support member.

The method of overlapping the layers for the 5-layer structure filter medium for an air filter 1 shown in FIG. 1 is not particularly limited. For example, for joining the first porous film and the second porous film, a raw tape to become the first porous film and a raw tape to become the second porous film can be individually fabricated and dried, and then these films can be overlapped and biaxially stretched (longitudinally and transversely stretched) to join each other. In this case, the first porous film and the second porous film are heated each time stretching is performed in an overlapping state, and heat is added for a total of two times, therefore the two porous films are adhered well, and peeling of the two porous films at the interface by later processes, etc., is suppressed. Also, instead of this method, after longitudinal stretching, it is possible to overlap and transversely stretch two films to become the two porous films for joining. Also, joining the porous films to each other can be done by heating near the PTFE melting point. Also, as the upstream air-permeable support member and the downstream air-permeable support member, it is possible to use the nonwoven fabric, woven fabric, metal mesh, resin netting, etc. described above. Here, when nonwoven fabric, etc. are used as the upstream air-permeable support member, it is possible to join the upstream air-permeable support member to the first porous film by utilizing an anchor effect due to partial melting of the upstream air-permeable support member induced by heat or melting of a hot-melt resin, or utilizing adhesion by a reactive adhesive, etc. The downstream air-permeable support member can be joined to the second porous film in the same manner. Also, when a nonwoven fabric, etc. are used as the pre-collection member, it is also possible to join the pre-collection member to the upstream air-permeable support member by utilizing an anchor effect due to partial melting of the pre-collection member induced by heat or melting of a hot-melt resin, or utilizing adhesion by a reactive adhesive, etc.

The method of overlapping the layers for the 6-layer structure filter medium for an air filter 2 shown in FIG. 2 is not particularly limited. For example, the two porous films are individually fabricated, and one of those porous films is sandwiched by the upstream air-permeable support member and the midstream air-permeable support member, and by performing heat lamination, it is possible to obtain a 3-layer structure. Then, the remaining other porous film can be joined to the 3-layer structure by heat lamination while performing transverse stretching. By further heat lamination of the downstream air-permeable support member on the second porous film, it is possible to join the downstream air-permeable support member to the second porous film. Also, when nonwoven fabric, etc. are used as the pre-collection member, it is also possible to join the pre-collection member to the upstream air-permeable support member by utilizing an anchor effect due to partial melting of the pre-collection member induced by heat or melting of a hot-melt resin, or utilizing adhesion by a reactive adhesive, etc.

The method of overlapping the layers for the 3-layer structure filter medium for an air filter 3 shown in FIG. 3 is not particularly limited. For example, when joining the first porous film and the second porous film, it is possible to join them in the same manner as with the filter medium for an air filter 1 of the 5-layer structure. Also, when a nonwoven fabric, etc. are used as the pre-collection member, it is possible to join the pre-collection member to the upstream side of the first porous film by utilizing an anchor effect due to partial melting of the pre-collection member induced by heat or melting of a hot-melt resin, or utilizing adhesion by a reactive adhesive, etc.

Because pressure is applied to the first porous film, the second porous film, the upstream air-permeable support member, the downstream air-permeable support member, and the pre-collection member (and in the case of filter medium for an air filter 2, also the midstream air-permeable support member), the film thickness of the filter medium for an air filter obtained by sticking together is not a simple total of the film thicknesses but falls within a range between 85 to 100% of the simple total of the film thicknesses.

EXAMPLES

The present invention is described in detail below using examples and comparative examples.

Example 1

66.5 wt % (polymer conversion) of a PTFE aqueous dispersion having an SSG of 2.160 (PTFE-A), 28.5 wt % (polymer conversion) of a low-molecular weight PTFE aqueous dispersion having melt viscosity, measured at 380° C. using a flow tester method, of 20,000 Pa·s (PTFE-B), and 5 wt % (polymer conversion) of an FEP aqueous dispersion having a melting point of 215° C. were mixed, 500 ml of a 1% aluminum nitrate aqueous solution was added as a coagulant, and co-coagulation was carried out by stirring. The powder which thus prepared was drained with a sieve, then further dried in a hot air dryer at 135° C. for 18 hours, to obtain a mixed powder of the aforedescribed three components.

Next, a hydrocarbon oil (IP SOLVENT 2028 made by Idemitsu Kosan Co. Ltd.) was added as a liquid lubricant (extrusion aid), in an amount of 35 weight parts to 100 weight parts of the mixed powder, and mixed at 20° C. Next, the mixture obtained thereby was extruded using a paste extruder, to obtain a sheet-shaped molded material. To the distal end of the paste extruder was attached a sheet die in which was formed a rectangular extrusion opening having 2 mm in length at the short sides×150 mm in length at the long sides. This sheet-shaped molded material was molded into a film profile by a calender roll heated to 70° C., obtaining a fluororesin film. This film was passed through a 200° C. hot air dryer to evaporate out the hydrocarbon oil and obtained an unbaked fluororesin film (first raw tape) in the form of a strip of average thickness of 300 µm and average width of 150 mm. Also, except that the mixing amount of the liquid lubricant was 33 weight parts, the same operation was performed as the first raw tape, and an unbaked fluororesin film (second raw tape) in the form of a strip of average thickness of 300 µm and average width of 150 mm was obtained.

Next, the first raw tape and the second raw tape were overlapped and stretched in the lengthwise direction (longitudinal direction) at a stretching ratio of 6.5. The stretching temperature was 300° C. Next, using a tenter capable of continuously clipping, the overlapped and stretched raw tape was stretched by a stretch ratio of 13.5 in the widthwise direction (transverse direction), and heat setting was carried out. At this time, the stretching temperature was 290° C. and the heat setting temperature was 390° C. A multi-layer porous film for which the first porous film 31 and the second porous film 32 were overlapped was obtained thereby.

As the upstream air-permeable support member 21 and the downstream air-permeable support member 22 shown in FIG. 1, a spun-bonded nonwoven (average fiber diameter: 20 µm, basis weight: 40 g/m$^2$, thickness: 0.2 mm) composed of fibers of core/sheath structure having a PET core and PE sheath was used.

The obtained multi-layer porous film was sandwiched by a spun-bonded nonwoven as the upstream air-permeable support member 21 arranged at the first porous film 31 side and a spun-bonded nonwoven as the downstream air-permeable support member 22 arranged at the second porous film 32 side, and joining was performed by thermal fusion bonding using a lamination apparatus to obtain the fluororesin overlapped body of example 1.

As the pre-collection member 10, a melt-blown nonwoven (basis weight: 30 g/m$^2$, thickness: 0.25 mm) composed of PP, which is fiber having average fiber diameter of 1.6 µm, was used.

The fluororesin overlapped body of the abovementioned example 1 and a melt-blown nonwoven that is the pre-collection member 10 arranged at the upstream air-permeable support member 21 side underwent heat lamination at 110° C. using 2 g/m$^2$ of an ethylene-vinyl acetate copolymer (EVA) hot-melt adhesive, to obtain the filter medium for an air filter 1 having the layer configuration shown in FIG. 1. The thickness of the filter medium 1 was 0.68 mm.

The filter medium 1 had pressure drop of 170 Pa and collection efficiency of 99.991%. There was no rise in pressure drop due to heat lamination. The pressure drop and collection efficiency are generally characteristics of the pre-collection member 10, the first porous film 31, and the second porous film 32.

The fabricated filter medium 1 underwent a pleating process by a rotary folding machine so as to have mountain folds and valley folds every 260 mm, and thereby creating a processed filter medium in a zigzag configuration as shown in FIG. 4. After that, a separator for which an aluminum plate underwent a corrugating process was inserted in the valley parts of the filter medium 1 to obtain a filter pack 40 having vertical length of 590 mm×horizontal length of 590 mm. The number of pleats at this time was 79.

The obtained filter pack 40 was fixed to an aluminum frame 50 having external dimension of 610 mm×610 mm (vertical×horizontal), internal dimension of 580 mm×580 mm (vertical×horizontal), and depth of 290 mm. The periphery of the filter pack was adhered with the frame 50 using a urethane adhesive for sealing, and the air filter unit 60 was obtained.

Example 2

This example is the same as Example 1, except that a spun-bonded nonwoven fabric of different basis weight and thickness from Example 1 as the upstream air-permeable support member 21 and the downstream air-permeable support member 22, and furthermore a spun-bonded nonwoven fabric as the midstream air-permeable support member 23 were provided between the first porous film 31 and the second porous film 32 of Example 1, and heat lamination was performed (i.e., the configuration of the filter medium 2 shown in FIG. 2).

In specific terms, the second porous film 32 obtained by stretching the second raw tape of Example 1 in the longitudinal direction and transverse direction was sandwiched between the downstream air-permeable support member 22 and the midstream air-permeable support member 23, joining was performed by thermal fusion bonding using a laminating apparatus, and the first fluororesin overlapped body of Example 2 was obtained. Furthermore, the first porous film 31 obtained by stretching the first raw tape of Example 1 in the longitudinal direction and the transverse direction was sandwiched between the first fluororesin overlapped body of Example 2 and the upstream air-permeable support member 21, joining was performed by thermal fusion bonding using a laminating apparatus, and the second fluororesin overlapped body of Example 2 was obtained. Then, the melt-blown nonwoven fabric that is the pre-collection member 10 and the second fluororesin overlapped body of Example 2 were joined by heat lamination at 110° C. using a laminating apparatus while using an ethylene-vinyl acetate copolymer (EVA) hot-melt adhesive, and the filter medium for an air filter 2 having the layer configuration shown in FIG. 2 was obtained.

Also, the process for obtaining the filter pack 40 and the air filter unit 60 using the pleating process was the same as with Example 1.

Example 3

This example is the same as Example 1, except that instead of the melt-blown nonwoven as the pre-collection member 10 of Example 1, a melt-blown PP nonwoven (basis weight: 10 g/m², thickness: 0.07 mm) composed of fibers having average fiber diameter of 1.7 μm was used. With this Example 3, a melt-blown nonwoven with a low basis weight was used.

Example 4

This example is the same as Example 1, except that instead of the melt-blown nonwoven as the pre-collection member 10 of Example 1, a melt-blown PP nonwoven (basis weight: 50 g/m², thickness: 0.37 mm) composed of fibers having average diameter of 1.8 μm was used. With this Example 4, a thick melt-blown nonwoven with a high basis weight was used.

Example 5

This example is the same as Example 2, except that instead of the first porous film 31 of Example 2, a porous film having the same physical properties as the second porous film 32 of Example 2 was used.

Example 6

This example is the same as Example 1, except that instead of the first porous film 31 of Example 1, a porous film having the same physical properties as the second porous film 32 of Example 1 was used, and that instead of the spun-bonded nonwoven as the upstream air-permeable support member 21 and the downstream air-permeable support member 22 of Example 1, a spun-bonded nonwoven (average fiber diameter: 20 μm, basis weight: 30 g/m², thickness: 0.16 mm) was used.

Example 7

This example is the same as Example 1, except that the spun-bonded nonwoven as the upstream air-permeable support member 21 of Example 1 was not used.

In specific terms, in the same manner as with Example 1, the first raw tape and the second raw tape were overlapped, stretched in the lengthwise direction (longitudinal direction), and stretched in the widthwise direction (transverse direction), and then heat setting was carried out to obtain a multi-layer porous film in which the first porous film 31 and the second porous film 32 were overlapped. Then, the spun-bonded nonwoven as the downstream air-permeable support member 22, which is the same as in Example 1, was arranged at second porous film 32 side of the multi-layer porous film, joining was performed by thermal fusion bonding using a laminating apparatus, and the fluororesin overlapped body of Example 7 was obtained. Then, the pre-collection member 10 that is the same as that of Example 1 was joined to the first porous film 31 side of the fluororesin overlapped body of Example 7 by using 2 g/m² of an ethylene-vinyl acetate copolymer (EVA) hot-melt adhesive, and performing heat lamination at 110° C., and the filter medium for an air filter of Example 7 was obtained.

Example 8

This example is the same as Example 1, except that the spun-bonded nonwoven as the upstream air-permeable support member 21 and the downstream air-permeable support member 22 of Example 1 was not used.

In specific terms, in the same manner as with Example 1, the first raw tape and the second raw tape were overlapped, stretched in the lengthwise direction (longitudinal direction), and stretched in the widthwise direction (transverse direction), and then heat setting was carried out to obtain a multi-layer porous film in which the first porous film 31 and the second porous film 32 were overlapped. Then, the pre-collection member 10 which is the same as in Example 1 was joined to the first porous film 31 side of the multi-layer porous film by using 2 g/m² of an ethylene-vinyl acetate copolymer (EVA) hot-melt adhesive, and performing heat lamination at 110° C., and the filter medium for an air filter 3 having the layer structure shown in FIG. 3 was obtained.

Example 9

This example is the same as Example 1, except that instead of the melt-blown nonwoven as the pre-collection member 10 of Example 1, a melt-blown nonwoven (basis weight: 0.7 g/m², thickness: 0.002 mm) composed of polypropylene (PP) which is fibers having average fiber diameter of 0.32 μm was used.

Comparative Example 1

The same first porous film 31, second porous film 32, upstream air-permeable support member 21, and downstream air-permeable support member 22 as those of Example 1 were used, the "multi-layer porous film in which the first porous film 31 and the second porous film 32 are overlapped" was sandwiched by a spun-bonded nonwoven as the upstream air-permeable support member 21 and a spun-bonded nonwoven as the downstream air-permeable support member 22, joining was performed by thermal fusion bonding using a laminating apparatus, and a fluororesin overlapped body was obtained.

The fluororesin overlapped body obtained in this way had pressure drop of 131 Pa and collection efficiency of 99.997%. The pressure drop and collection efficiency are generally characteristics of the first porous film 31 and the second porous film 32 since the upstream air-permeable support member 21 and the downstream air-permeable support member 22 do not substantially contribute to them.

Also, the process to obtain the filter pack 40 and the air filter unit 60 using pleating processing was the same as with Example 1.

Comparative Example 2

Hydrocarbon oil (IP SOLVENT 2028, Idemitsu Kosan Co. Ltd.), as an extrusion liquid lubricant, was added in an amount of 33.5 mass percent per kilogram of PTFE fine powder having an average molecular weight of 6,500,000 (Polyflon Fine Powder F106, Daikin Industries) and mixed at 20° C. Next, the mixture obtained was extruded using a paste extruder to obtain a round bar-shaped molded material. The round bar-shaped molded material was molded into a film profile by a calender roll heated to 70° C., obtaining a PTFE film. The film was passed through a 250° C. hot air dryer to evaporate out the hydrocarbon oil and obtain an unbaked PTFE film in the form of a strip of average thickness of 200 μm and average width of 150 mm. Next, the unbaked PTFE film was stretched at a stretch ratio of 5 in the lengthwise direction. The stretching temperature was 250° C. Next, using a tenter capable of continuously clipping the stretched unbaked film, the film was stretched at a stretch ratio of 32 in the widthwise direction, and heat setting was carried out. At this time, the stretching temperature was 290° C. and the heat setting temperature was 390° C. A PTFE porous film (filling rate: 4.0%, average fiber diameter: 0.069 μm, thickness: 0.009 μm) was obtained thereby.

As the air-permeable support layers, a spun-bonded nonwoven (average fiber diameter: 20 μm, basis weight: 40 g/m², thickness: 0.20 mm) composed of fibers having a core/sheath structure having a PET core and a PE sheath was used.

The aforementioned spun-bonded nonwoven as the upstream air-permeable support member 21 and the downstream air-permeable support member 22 were respectively joined to the one side and the other side of the obtained PTFE porous film by thermal fusion bonding using a laminating apparatus, to obtain a PTFE overlapped body. The PTFE overlapped body thereby obtained, had pressure drop of 118 Pa and collection efficiency of 99.998% according to the measurement method described above. This pressure drop and collection efficiency are generally characteristics of the PTFE porous film.

The process to obtain the filter pack 40 and the air filter unit 60 by the pleating process is the same as that of Example 1.

Comparative Example 3

This is the same as Comparative Example 2, except that the pre-collection member 10 was further provided on the PTFE overlapped body of Comparative Example 2.

Here, as the pre-collection member 10, a melt-blown nonwoven (basis weight: 30 g/m², thickness: 0.25 mm) composed of PP, which is fibers having average fiber diameter of 1.6 μm used. The PTFE overlapped body of Comparative Example 2 and the melt-blown nonwoven which is the pre-collection member 10 were heat-laminated at 110° C. using 2 g/m² of an ethylene-vinyl acetate copolymer (EVA) hot-melt adhesive to obtain a PP overlapped body (thickness: 0.14 mm).

A filter medium for an air filter having a 4-layer structure was thereby obtained. The thickness of the filter medium was 0.569 mm.

The process to obtain the filter pack 40 and the air filter unit 60 using the pleating process was the same as with Example 1.

Comparative Example 4

The glass filter medium can be manufactured with the methods disclosed in Japanese Laid-open Patent Publication No. 2007-7586, Japanese Laid-open Patent Publication No. H05-123513, and Japanese Patent No. 3014440.

The glass filter medium can be produced from a slurry in which glass fibers are dispersed in water by using a paper machine for transporting the glass fibers. The paper machine may be a combination machine in which two of the same or different machines for producing general paper or wet nonwovens are used; e.g., a Fourdrinier paper machine, a cylinder paper machine, or a tilted wire type paper machine. Binding fibers to each other using a binder can be accomplished by having the binder directly adhere to the glass fibers, or impregnating glass fibers in a binder solution in which a binder is dissolved in a solvent, and then drying the impregnated fibers. Any known binder can be used, such as an acrylic resin, phenol resin, etc.

In Comparative Example 4, a S320M HEPA filter medium for an air filter made by Hokuetsu Kishu Paper Co., Ltd. was used as the glass filter medium described above.

The process for obtaining the filter pack 40 and the air filter unit 60 using the pleating process was the same as with Example 1.

Comparative Example 5

This example is the same as Example 5, except that the pre-collection member 10 was not provided.

In specific terms, the first porous film 31, the second porous film 32, the upstream air-permeable support member 21, the downstream air-permeable support member 22, and the midstream air-permeable support member 23 provided with the physical properties of each layer of Example 5 were used, and overlapping was performed in the same manner as with the overlapping process of the second fluororesin overlapped body of Example 2, whereby the filter medium for an air filter of Comparative Example 5 was obtained.

The process to obtain the filter pack 40 and the air filter unit 60 with the pleating process was the same as with Example 1.

Comparative Example 6

This example is the same as Example 1, except that instead of the melt-blown nonwoven as the pre-collection member 10 of Example 1, a melt-blown nonwoven (basis weight: 2 g/m$^2$, thickness: 0.02 mm) with a large PF value was used.

Comparative Example 7

This example is the same as Example 1, except that a melt-blown nonwoven (basis weight: 32 g/m$^2$, thickness: 0.26 mm) with a large PF value was used instead of a melt-blown nonwoven as the pre-collection member 10 of Example 1, the upstream air-permeable support member 21 of different basis weight and thickness was used instead of the spun-bonded nonwoven as the upstream air-permeable support member 21 of Example 1 (same as the upstream air-permeable support member of Example 2), and the downstream air-permeable support member 22 of different basis weight and thickness was used instead of the spun-bonded nonwoven as the downstream air-permeable support member 22 of Example 1 (same as the downstream air-permeable support member of Example 2).

Comparative Example 8

This example is the same as Example 1, except that a melt-blown nonwoven (basis weight: 28 g/m$^2$, thickness: 0.23 mm) with a low PF value was used instead of the melt-blown nonwoven as the pre-collection member 10 of Example 1, the upstream air-permeable support member 21 of different basis weight and thickness was used instead of the spun-bonded nonwoven as the upstream air-permeable support member 21 of Example 1 (same as the upstream air-permeable support member of Example 2), and the downstream air-permeable support member 22 of different basis weight and thickness was used instead of the spun-bonded nonwoven as the downstream air-permeable support member 22 of Example 1 (same as the downstream air-permeable support member of Example 2).

(Pressure Drop)

A measurement sample of the filter medium was set in a filter holder having a diameter of 100 mm, the inlet port side was pressurized with a compressor, and the flow of air passing through was adjusted to 5.3 cm/s with a flowmeter. Then, the pressure drop at that time was measured using a manometer.

(Collection Efficiency of NaCl Particles Having a Particle Diameter of 0.3 μm)

According to the method disclosed in the NaCl aerosol generating method (pressurized spray method) of JIS B9928, Appendix 5 (Provisions), NaCl particles generated by an atomizer were classified to a diameter of 0.3 μm with an electrostatic classifier (made by TSI Corp.), and after using americium 241 to neutralize the particle charge, the flow passing through was adjusted to 5.3 cm/s, the number of particles in front of and behind the filter medium which is the measurement sample was found using a particle counter (CNC, made by TSI Corp.), and the collection efficiency was calculated using the following formula.

Collection efficiency (%)=(CO/CI)×100

CO=Number of 0.3-μm NaCl particles collected by the measurement sample

CI=Number of 0.3-μm NaCl particles supplied to the measurement sample (PF value)

Using NaCl particles having a particle diameter of 0.3 μm, the PF value was calculated from the filter medium pressure drop and collection efficiency (collection efficiency of NaCl particles having a particle diameter of 0.3 μm) using the following formula.

PF value={−log((100−collection efficiency (%))/100)}/(pressure drop (Pa)/1000)

The value of 100−collection efficiency (%) is a value known as permeability (%).

(Dust Olding Capacity of Polyalphaolefin)

For evaluation, the test for measuring increased pressure drop during passing through of polyalphaolefin (PA) particles (liquid particles) was performed. Specifically, the pressure drop when air containing PAO particles continuously passed through a sample filtration material of effective filtration area of 50 cm$^2$ at a flow rate of 5.3 cm/s was measured over time by a differential pressure gauge (U shaped tube manometer), and when the pressure drop increased by 250 Pa, the dust holding capacity (g/m$^2$) which is the weight of PAO particles held in the filter medium per unit area of the filter medium was calculated. PAO particles generated by a Laskin nozzle (count median diameter: 0.25 μm) were used for the PAO particles, and the density of the PAO particles was approximately 1,000,000 to 6,000,000 items/cm$^3$.

The dust holding capacity is not defined for HEPA filtration media, but the filter initial pressure drop is typically approximately 250 Pa or less with a HEPA unit, and the recommended filter exchange timing is typically at the time when the pressure drop increased twice the initial pressure drop of the filter. Also, the initial pressure drop of a standard HEPA glass filter medium is approximately 250 to 300 Pa. Accordingly, the end time of the abovementioned test for evaluation of dust holding capacity of the filter medium was set at the time when the pressure drop is increased by 250 Pa.

(Average Pore Diameter)

The average pore diameter (mean flow pore size) measured according to the description in ASTM F316-86 was set as the average pore diameter (mean flow pore diameter) of the porous film. Actual measurement was performed by a Coulter Porometer (made by Coulter Electronics, UK).

(Thickness of Porous Film)

Using a film thickness meter (1D-110MH model, made by Mitutoyo Corp.), five sheets of the measurement subject were overlapped and the overall film thickness was measured. The numerical value of the measured thickness value divided by 5 was used as the thickness of a single film.

(Film Thickness of Each Layer of the Filter Medium Except For the Porous Film Prior to Joining, and Film Thickness of the Overall Filter Medium)

An ABS digimatic indicator (made by Mitutoyo Corp., ID-C112CX) was fixed to a gauge stand, and the thickness value when a load of 0.3 N was applied to the measurement subject was read.

Information regarding the filter medium for an air filter of each example and each comparative example (before being used as a filter pack and/or air filter unit), together with the physical properties of each member used in fabricating each filter medium for an air filter are shown in Table 1, Table 2, Table 3, Table 4, and Table 5 below.

TABLE 1

| | Contents | Ex. 1 | Ex. 2 | Ex. 3 | Ex. 4 |
|---|---|---|---|---|---|
| Pre-collection member | Basis weight (g/m$^2$) | 30 | 30 | 10 | 50 |
| | Fiber diameter (μm) | 1.6 | 1.6 | 1.7 | 1.8 |
| | Thickness (mm) | 0.25 | 0.25 | 0.07 | 0.37 |
| | Collection efficiency (%) (0.3 μm particles) | 58 | 58 | 27 | 79 |
| | Pressure drop (Pa) | 49 | 49 | 17 | 53 |
| | PF value | 7.7 | 7.7 | 8.0 | 12.8 |
| Upstream air-permeable support member | Basis weight (g/m$^2$) | 40 | 30 | 40 | 40 |
| | Fiber diameter (μm) | 20 | 20 | 20 | 20 |
| | Thickness (mm) | 0.2 | 0.16 | 0.2 | 0.2 |
| | Collection efficiency (%) (0.3 μm particles) | 0 | 0 | 0 | 0 |
| | Pressure drop (Pa) | <10 | <10 | <10 | <10 |
| First porous film | Components | 3 components | 3 components | 3 components | 3 components |
| | Thickness (mm) | 0.05 | 0.05 | 0.05 | 0.05 |
| | Pressure drop (Pa) | 60 | 60 | 60 | 60 |
| | Collection efficiency (%) (0.3 μm particles) | 99 | 99 | 99 | 99 |
| | Pore diameter (μm) | 3.5 | 3.5 | 3.5 | 3.5 |
| | Fiber diameter (μm) | 0.13-0.15 | 0.13-0.15 | 0.13-0.15 | 0.13-0.15 |
| | Dust holding capacity (PHC, 250 Pa) (g/m$^2$) | 26.5 | 26.5 | 26.5 | 26.5 |
| | PF value | 33.3 | 33.3 | 33.3 | 33.3 |
| Midstream air-permeable support member | Basis weight (g/m$^2$) | | 30 | | |
| | Fiber diameter (μm) | | 20 | | |
| | Thickness (mm) | | 0.16 | | |
| | Collection efficiency (%) (0.3 μm particles) | | 0 | | |
| | Pressure drop (Pa) | | <10 | | |
| Second porous film | Components | 3 components | 3 components | 3 components | 3 components |
| | Thickness (mm) | 0.05 | 0.05 | 0.05 | 0.05 |
| | Pressure drop (Pa) | 70 | 70 | 70 | 70 |
| | Collection efficiency (%) (0.3 μm particles) | 99.7 | 99.7 | 99.7 | 99.7 |
| | Pore diameter (μm) | 2.3 | 2.3 | 2.3 | 2.3 |
| | Fiber diameter (μm) | 0.10-0.13 | 0.10-0.13 | 0.10-0.13 | 0.10-0.13 |
| | Dust holding capacity (PHC, 250 Pa) (g/m$^2$) | 22 | 22 | 22 | 22 |
| | PF value | 36 | 36 | 36 | 36 |
| Downstream air-permeable support member | Basis weight (g/m$^2$) | 40 | 30 | 40 | 40 |
| | Fiber diameter (μm) | 20 | 20 | 20 | 20 |
| | Thickness (mm) | 0.2 | 0.16 | 0.2 | 0.2 |
| | Collection efficiency (%) (0.3 μm particles) | 0 | 0 | 0 | 0 |
| | Pressure drop (Pa) | <10 | <10 | <10 | <10 |
| Overall filter medium | Layer structure | 5 | 6 | 5 | 5 |
| | Pressure drop (Pa) | 170 | 170 | 150 | 195 |
| | Collection efficiency (%) (0.3 μm particles) | 99.991 | 99.991 | 99.997 | 99.998 |
| | Thickness (mm) | 0.68 | 0.83 | 0.52 | 0.79 |
| | Dust holding capacity (PHC, 250 Pa) (g/m$^2$) | 89 | 89 | 42 | 129 |
| | PF value | 23.8 | 23.8 | 30.2 | 24.1 |
| | PF value ratio (PF value of pre-collection member/PF value when first and second porous films are overlapped) | 0.223 | 0.223 | 0.232 | 0.371 |

TABLE 2

| Contents | | Ex. 5 | Ex. 6 | Ex. 7 | Ex. 8 |
|---|---|---|---|---|---|
| Pre-collection member | Basis weight (g/m²) | 30 | 30 | 30 | 30 |
| | Fiber diameter (μm) | 1.6 | 1.6 | 1.6 | 1.6 |
| | Thickness (mm) | 0.25 | 0.25 | 0.25 | 0.25 |
| | Collection efficiency (%) (0.3 μm particles) | 58 | 58 | 58 | 58 |
| | Pressure drop (Pa) | 49 | 49 | 49 | 49 |
| | PF value | 7.7 | 7.7 | 7.7 | 7.7 |
| Upstream air-permeable support member | Basis weight (g/m²) | 30 | 30 | | |
| | Fiber diameter (μm) | 20 | 20 | | |
| | Thickness (mm) | 0.16 | 0.16 | | |
| | Collection efficiency (%) (0.3 μm particles) | 0 | 0 | | |
| | Pressure drop (Pa) | <10 | <10 | | |
| First porous film | Components | 3 components | 3 components | 3 components | 3 components |
| | Thickness (mm) | 0.05 | 0.05 | 0.05 | 0.05 |
| | Pressure drop (Pa) | 70 | 70 | 60 | 60 |
| | Collection efficiency (%) (0.3 μm particles) | 99.7 | 99.7 | 99 | 99 |
| | Pore diameter (μm) | 2.3 | 2.3 | 3.5 | 3.5 |
| | Fiber diameter (μm) | 0.10-0.13 | 0.10-0.13 | 0.13-0.15 | 0.13-0.15 |
| | Dust holding capacity (PHC, 250 Pa) (g/m²) | 22 | 22 | 26.5 | 26.5 |
| | PF value | 36 | 36 | 33.3 | 33.3 |
| Midstream air-permeable support member | Basis weight (g/m²) | 30 | | | |
| | Fiber diameter (μm) | 20 | | | |
| | Thickness (mm) | 0.16 | | | |
| | Collection efficiency (%) (0.3 μm particles) | 0 | | | |
| | Pressure drop (Pa) | <10 | | | |
| Second porous film | Components | 3 components | 3 components | 3 components | 3 components |
| | Thickness (mm) | 0.05 | 0.05 | 0.05 | 0.05 |
| | Pressure drop (Pa) | 70 | 70 | 70 | 70 |
| | Collection efficiency (%) (0.3 μm particles) | 99.7 | 99.7 | 99.7 | 99.7 |
| | Pore diameter (μm) | 2.3 | 2.3 | 2.3 | 2.3 |
| | Fiber diameter (μm) | 0.10-0.13 | 0.10-0.13 | 0.10-0.13 | 0.10-0.13 |
| | Dust holding capacity (PHC, 250 Pa) (g/m²) | 22 | 22 | 22 | 22 |
| | PF value | 36 | 36 | 36 | 36 |
| Downstream air-permeable support member | Basis weight (g/m²) | 30 | 30 | 40 | |
| | Fiber diameter (μm) | 20 | 20 | 20 | |
| | Thickness (mm) | 0.16 | 0.16 | 0.2 | |
| | Collection efficiency (%) (0.3 μm particles) | 0 | 0 | 0 | |
| | Pressure drop (Pa) | <10 | <10 | <10 | |
| Overall filter medium | Layer structure | 6 | 5 | 4 | 3 |
| | Pressure drop (Pa) | 189 | 189 | 166 | 161 |
| | Collection efficiency (%) (0.3 μm particles) | 99.997 | 99.997 | 99.991 | 99.991 |
| | Thickness (mm) | 0.82 | 0.66 | 0.48 | 0.31 |
| | Dust holding capacity (PHC, 250 Pa) (g/m²) | 72 | 72 | 89 | 89 |
| | PF value | 23.9 | 23.9 | 24.4 | 25.1 |
| PF value ratio (PF value of pre-collection member/PF value when first and second porous films are overlapped) | | 0.238 | 0.238 | 0.223 | 0.223 |

TABLE 3

| Contents | | Ex. 9 | Comp. Ex. 1 | Comp. Ex. 2 |
|---|---|---|---|---|
| Pre-collection member | Basis weight (g/m²) | 0.7 | | |
| | Fiber diameter (μm) | 0.32 | | |
| | Thickness (mm) | 0.002 | | |
| | Collection efficiency (%) (0.3 μm particles) | 27 | | |
| | Pressure drop (Pa) | 9.6 | | |
| | PF value | 14.2 | | |
| Upstream air-permeable support member | Basis weight (g/m²) | 40 | 40 | 40 |
| | Fiber diameter (μm) | 20 | 20 | 20 |
| | Thickness (mm) | 0.2 | 0.2 | 0.2 |
| | Collection efficiency (%) (0.3 μm particles) | 0 | 0 | 0 |
| | Pressure drop (Pa) | <10 | <10 | <10 |

TABLE 3-continued

| Contents | | Ex. 9 | Comp. Ex. 1 | Comp. Ex. 2 |
|---|---|---|---|---|
| First porous film | Components | 3 components | 3 components | 1 component |
| | Thickness (mm) | 0.05 | 0.05 | 0.009 |
| | Pressure drop (Pa) | 60 | 60 | 118 |
| | Collection efficiency (%) (0.3 μm particles) | 99 | 99 | 99.998 |
| | Pore diameter (μm) | 3.5 | 3.5 | 0.75 |
| | Fiber diameter (μm) | 0.13-0.15 | 0.13-0.15 | 0.069 |
| | Dust holding capacity (PHC, 250 Pa) (g/m²) | 26.5 | 26.5 | 4.5 |
| | PF value | 33.3 | 33.3 | 39.8 |
| Midstream air-permeable support member | Basis weight (g/m²) | | | |
| | Fiber diameter (μm) | | | |
| | Thickness (mm) | | | |
| | Collection efficiency (%) (0.3 μm particles) | | | |
| | Pressure drop (Pa) | | | |
| Second porous film | Components | 3 components | 3 components | |
| | Thickness (mm) | 0.05 | 0.05 | |
| | Pressure drop (Pa) | 70 | 70 | |
| | Collection efficiency (%) (0.3 μm particles) | 99.7 | 99.7 | |
| | Pore diameter (μm) | 2.3 | 2.3 | |
| | Fiber diameter (μm) | 0.10-0.13 | 0.10-0.13 | |
| | Dust holding capacity (PHC, 250 Pa) (g/m²) | 22 | 22 | |
| | PF value | 36 | 36 | |
| Downstream air-permeable support member | Basis weight (g/m²) | 40 | 40 | 40 |
| | Fiber diameter (μm) | 20 | 20 | 20 |
| | Thickness (mm) | 0.2 | 0.2 | 0.2 |
| | Collection efficiency (%) (0.3 μm particles) | 0 | 0 | 0 |
| | Pressure drop (Pa) | <10 | <10 | <10 |
| Overall filter medium | Layer structure | 5 | 4 | 3 |
| | Pressure drop (Pa) | 140 | 131 | 118 |
| | Collection efficiency (%) (0.3 μm particles) | 99.997 | 99.997 | 99.998 |
| | Thickness (mm) | 0.5 | 0.49 | 0.36 |
| | Dust holding capacity (PHC, 250 Pa) (g/m²) | 47 | 25 | 4.5 |
| | PF value | 32.3 | 34.5 | 39.8 |
| PF value ratio (PF value of pre-collection member/PF value when first and second porous films are overlapped | | 0.412 | | |

TABLE 4

| Contents | | Comp. Ex. 3 | Comp. Ex. 4 (glass filter medium) | Comp. Ex. 5 |
|---|---|---|---|---|
| Pre-collection member | Basis weight (g/m²) | 30 | | |
| | Fiber diameter (μm) | 1.6 | | |
| | Thickness (mm) | 0.25 | | |
| | Collection efficiency (%) (0.3 μm particles) | 58 | | |
| | Pressure drop (Pa) | 49 | | |
| | PF value | 7.7 | | |
| Upstream air-permeable support member | Basis weight (g/m²) | 40 | | 30 |
| | Fiber diameter (μm) | 20 | | 20 |
| | Thickness (mm) | 0.2 | | 0.16 |
| | Collection efficiency (%) (0.3 μm particles) | 0 | | 0 |
| | Pressure drop (Pa) | <10 | | <10 |
| First porous film | Components | 1 component | | 3 components |
| | Thickness (mm) | 0.009 | | 0.05 |
| | Pressure drop (Pa) | 118 | | 70 |
| | Collection efficiency (%) (0.3 μm particles) | 99.998 | | 99.7 |
| | Pore diameter (μm) | 0.75 | | 2.3 |
| | Fiber diameter (μm) | 0.069 | | 0.10-0.13 |
| | Dust holding capacity (PHC, 250 Pa) (g/m²) | 4.5 | | 22 |
| | PF value | 39.8 | | 36 |
| Midstream air-permeable support member | Basis weight (g/m²) | | | 30 |
| | Fiber diameter (μm) | | | 20 |
| | Thickness (mm) | | | 0.16 |

TABLE 4-continued

| Contents | | Comp. Ex. 3 | Comp. Ex. 4 (glass filter medium) | Comp. Ex. 5 |
|---|---|---|---|---|
| Second porous film | Collection efficiency (%) (0.3 μm particles) | | | 0 |
| | Pressure drop (Pa) | | | <10 |
| | Components | | | 3 components |
| | Thickness (mm) | | | 0.05 |
| | Pressure drop (Pa) | | | 70 |
| | Collection efficiency (%) (0.3 μm particles) | | | 99.7 |
| | Pore diameter (μm) | | | 2.3 |
| | Fiber diameter (μm) | | | 0.10-0.13 |
| | Dust holding capacity (PHC, 250 Pa) (g/m$^2$) | | | 22 |
| | PF value | | | 36 |
| Downstream air-permeable support member | Basis weight (g/m$^2$) | 40 | | 30 |
| | Fiber diameter (μm) | 20 | | 20 |
| | Thickness (mm) | 0.2 | | 0.16 |
| | Collection efficiency (%) (0.3 μm particles) | 0 | | 0 |
| | Pressure drop (Pa) | <10 | | <10 |
| Overall filter medium | Layer structure | 4 | 1 | 5 |
| | Pressure drop (Pa) | 160 | 286 | 140 |
| | Collection efficiency (%) (0.3 μm particles) | 99.994 | 99.99 | 99.997 |
| | Thickness (mm) | 0.57 | 0.4 | 0.58 |
| | Dust holding capacity (PHC, 250 Pa) (g/m$^2$) | 16 | 18.5 | 20 |
| | PF value | 26.4 | 14 | 32.3 |
| PF value ratio (PF value of pre-collection member/PF value when first and second porous films are overlapped | | 0.193 | | |

TABLE 5

| Contents | | Comp. Ex. 6 | Comp. Ex. 7 | Comp. Ex. 8 |
|---|---|---|---|---|
| Pre-collection member | Basis weight (g/m$^2$) | 2 | 32 | 28 |
| | Fiber diameter (μm) | 0.37 | 3.3 | 30 |
| | Thickness (mm) | 0.02 | 0.26 | 0.23 |
| | Collection efficiency (%) (0.3 μm particles) | 49 | 20 | 12 |
| | Pressure drop (Pa) | 17 | 6 | 12 |
| | PF value | 17.2 | 16.2 | 4.6 |
| Upstream air-permeable support member | Basis weight (g/m$^2$) | 40 | 30 | 30 |
| | Fiber diameter (μm) | 20 | 20 | 20 |
| | Thickness (mm) | 0.2 | 0.16 | 0.16 |
| | Collection efficiency (%) (0.3 μm particles) | 0 | 0 | 0 |
| | Pressure drop (Pa) | <10 | <10 | <10 |
| First porous film | Components | 3 components | 3 components | 3 components |
| | Thickness (mm) | 0.05 | 0.05 | 0.05 |
| | Pressure drop (Pa) | 60 | 60 | 60 |
| | Collection efficiency (%) (0.3 μm particles) | 99 | 99 | 99 |
| | Pore diameter (μm) | 3.5 | 3.5 | 3.5 |
| | Fiber diameter (μm) | 0.13-0.15 | 0.13-0.15 | 0.13-0.15 |
| | Dust holding capacity (PHC, 250 Pa) (g/m$^2$) | 26.5 | 26.5 | 26.5 |
| | PF value | 33.3 | 33.3 | 33.3 |
| Midstream air-permeable support member | Basis weight (g/m$^2$) | | | |
| | Fiber diameter (μm) | | | |
| | Thickness (mm) | | | |
| | Collection efficiency (%) (0.3 μm particles) | | | |
| | Pressure drop (Pa) | | | |
| Second porous film | Components | 3 components | 3 components | 3 components |
| | Thickness (mm) | 0.05 | 0.05 | 0.05 |
| | Pressure drop (Pa) | 70 | 70 | 70 |
| | Collection efficiency (%) (0.3 μm particles) | 99.7 | 99.7 | 99.7 |
| | Pore diameter (μm) | 2.3 | 2.3 | 2.3 |
| | Fiber diameter (μm) | 0.10-0.13 | 0.10-0.13 | 0.10-0.13 |
| | Dust holding capacity (PHC, 250 Pa) (g/m$^2$) | 22 | 22 | 22 |
| | PF value | 36 | 36 | 36 |

TABLE 5-continued

| Contents | | Comp. Ex. 6 | Comp. Ex. 7 | Comp. Ex. 8 |
|---|---|---|---|---|
| Downstream air-permeable support member | Basis weight (g/m$^2$) | 40 | 30 | 30 |
| | Fiber diameter (μm) | 20 | 20 | 20 |
| | Thickness (mm) | 0.2 | 0.16 | 0.16 |
| | Collection efficiency (%) (0.3 μm particles) | 0 | 0 | 0 |
| | Pressure drop (Pa) | <10 | <10 | <10 |
| Overall filter medium | Layer structure | 5 | 5 | 5 |
| | Pressure drop (Pa) | 140 | 122 | 150 |
| | Collection efficiency (%) (0.3 μm particles) | 99.998 | 99.977 | 99.998 |
| | Thickness (mm) | 0.52 | 0.62 | 0.59 |
| | Dust holding capacity (PHC, 250 Pa) (g/m$^2$) | 38 | 32.7 | 39 |
| | PF value | 33.6 | 29.8 | 31.3 |
| PF value ratio (PF value of pre-collection member/PF value when first and second porous films are overlapped | | 0.499 | 0.470 | 0.133 |

As can be understood from Tables 1 to 5, with all of the examples, it is possible to have a dust holding capacity of 40 g/m$^2$ or greater for the overall filter medium even when the collection efficiency of the overall filter medium is maintained at 99.97 or greater while keeping the pressure drop of the overall filter medium at 200 Pa or less. The dust holding capacity of 40 g/m$^2$ or greater is unprecedented.

Here, for example, the structure is provided with the first porous film and the second porous film in both Example 1 and Comparative Example 1, and the pre-collection member 10 is further provided in Example 1 at the upstream side in relation to the overall filter medium of the Comparative Example 1. Here, the ratio (7.7/34.5=0.223) of the PF value (7.7) of the pre-collection member 10 of Example 1 to the PF value (34.5) of the overall filter medium of Comparative Example 1 is within a range of 0.20 or greater and 0.45 or less. Therefore, it is possible to collect dust in the pre-collection member 10 at a level at which clogging does not occur prematurely in the pre-collection member 10, suitably reduce the collecting load on the first porous film 31 and the second porous film 32 at the downstream side, and collect a greater amount of dust in a broad area in the thickness direction, enabling an increase in the dust holding capacity.

Also, even in Example 9 in which an item with a high PF value (PF value 14.2) was used as the pre-collection member, it was possible to achieve sufficient dust holding capacity. However, with Comparative Example 6 and Comparative Example 7 in which the pre-collection member with an even higher PF value was used (PF value 17.2 and PF value 16.2, respectively), the dust holding capacity was below 40 g/m$^2$. This was presumably because, in the examples of Comparative Example 6 and Comparative Example 7, though it is possible to collect a large amount of dust using the pre-collection member, clogging in the pre-collection member easily occurs; therefore, it is not possible to make sufficient use of the first porous film and the second porous film at the further downstream side (clogging in the pre-collection member occurs before clogging in the first porous film and the second porous film occurs).

On the other hand, even in Comparative Example 8 in which a pre-collection member with a low PF value (PF value 4.6) was used, the dust holding capacity was below 40 g/m$^2$. This is presumably because, in the example in Comparative Example 8, though clogging in the pre-collection member is suppressed, by concentrating the load on the first porous film and the second porous film at the further downstream side, clogging occurs prematurely at the first porous film and the second porous film.

Here, because the upstream air-permeable support member 21 and the downstream air-permeable support member 22 substantially have no effect on the pressure drop and/or the collection efficiency, the PF value (34.5) of the overall filter medium of Comparative Example 1 is substantially equivalent to the contribution amount provided by the first porous film 31 and the second porous film 32. Therefore, the ratio of the PF value of the pre-collection member of Example 1 to the PF value of the overall filter medium of Comparative Example 1 is substantially equivalent to the ratio of the PF value of the pre-collection member of Example 1 to the PF value when the first porous film and the second porous film of Example 1 are overlapped.

When Example 1 and Example 2, in which the pressure drop and the collection efficiency with the first porous film are lower than that with the second porous film, are compared with Example 5 and Example 6, in which the physical properties of the first porous film and the second porous film are equal, it is evident that the dust holding capacity is increased more in a case of providing a specific difference between the upstream side porous film and the downstream side porous film.

Comparing Example 3 with Example 4 shows that when the basis weight of the pre-collection member 10 is increased and the thickness is increased, it is evident that the dust holding capacity of the overall filtration medium can be further increased though the pressure drop increases as well. When the basis weight of the pre-collection member 10 decreases and the thickness decreases, it is evident that the pressure drop can be suppressed.

In Example 7, the upstream air-permeable support member 21 was omitted, and in Example 8, the upstream air-permeable support member 21 and the downstream air-permeable support member 22 were both omitted; however, even in these examples, it is evident that sufficient dust holding capacity can be achieved.

A description regarding to the filter medium for an air filter, the filter pack, the air filter unit, and the method for producing a filter medium for an air filter was provided in detail above; however, the present invention is not limited to the embodiments noted above. Various revisions and modifications are included within a scope that does not depart from the spirit of the present invention.

What is claimed is:

1. A filter medium for an air filter to collect dust in an air current, comprising:
    a first porous film mainly containing a fluororesin;
    a second porous film mainly containing a fluororesin, and arranged to a downstream side of the first porous film in the air current; and
    a pre-collection member arranged to collect a portion of the dust in the air current, the pre-collection member being arranged to an upstream side of the first porous film in the air current,
    the pre-collection member having a pressure drop when air is passed therethrough at a flow rate of 5.3 cm/s of 15 Pa or greater and less than 55 Pa,
    the pre-collection member having a collection efficiency of NaCl particles having a particle diameter of 0.3 μm when air containing the particles is passed therethrough at a flow rate of 5.3 cm/s of 25% or greater and less than 80%,
    the pre-collection member having a thickness of 0.4 mm or less,
    the pre-collection member alone having a PF value of 7 or greater and 15 or less, the PF value being determined from the following formula: PF value={−log((100−collection efficiency (%))/100)}/(pressure drop (Pa)/1000),
    a ratio of the PF value of the pre-collection member alone to a PF value of the porous films including the first porous film and the second porous film overlapped with each other is 0.20 or greater and 0.45 or less, and
    in the filter medium for an air filter,
        the pressure drop when air passes through at a flow rate of 5.3 cm/s is less than 200 Pa, and
        the collection efficiency of NaCl particles having a particle diameter of 0.3 μm when the air containing the particles passes through at a flow rate of 5.3 cm/s is 99.97% or greater.

2. The filter medium for an air filter according to claim 1, wherein,
    when air containing polyalphaolefin particles having a count median particle diameter of 0.25 μm continuously passes through at a flow rate of 5.3 cm/s, and the pressure drop is increased by 250 Pa, a dust holding capacity of the polyalphaolefin particles is 40 g/m² or greater.

3. The filter medium for an air filter according to claim 1, further comprising
    an upstream air-permeable support member arranged to support the first porous film, the upstream air-permeable support member being arranged further to the upstream side in the air current than the first porous film.

4. The filter medium for an air filter claim 1, further comprising
    a downstream air-permeable support member arranged to support the second porous film, the downstream air-permeable support member being arranged to the downstream side of the second porous film in the air current.

5. The filter medium for an air filter claim 1, wherein
    the pressure drop is smaller through the first porous film than through the second porous film when air passes therethrough at a flow rate of 5.3 cm/s, and
    the collection efficiency of NaCl particles having a particle diameter of 0.3 μm is higher in the second porous film than in the first porous film when air containing the particles is passed therethrough at a flow rate of 5.3 cm/s.

6. The filter medium for an air filter according to claim 1, wherein
    in the first porous film, the pressure drop is 30 Pa or greater and 90 Pa or less, the collection efficiency is 95% or greater and 99% or less, and when air containing polyalphaolefin particles having a count median particle diameter of 0.25 μm continuously passes through at a flow rate of 5.3 cm/s, and the pressure drop is increased by 250 Pa, the dust holding capacity of the polyalphaolefin particles is 25 g/m² or greater and 35 g/m² or less.

7. The filter medium for an air filter according to claim 1, wherein
    the ratio of the PF value of the pre-collection member alone to the PF value of the porous films including the first porous film and the second porous film overlapped with each other is 0.20 or greater and 0.38 or less.

8. The filter medium for an air filter according to claim 1, wherein
    the first porous film and the second porous film mainly include fibril-forming polytetrafluoroethylene, a non-fibril-forming non-melting-processable component, and a non-fibril-forming hot-melt-processable component having a melting point below 320° C.

9. A method for producing a filter medium for an air filter to collect dust in an air current, comprising:
    obtaining a first porous film and a second porous film mainly containing a fluororesin;
    arranging the first porous film to an upstream side of the second porous film in the air current;
    arranging a pre-collection member to collect a portion of the dust in the air current to the upstream side of the first porous film in the air current; and
    integrating the first porous film, the second porous film, and the pre-collection member by heat lamination,
    the pre-collection member having a pressure drop when air is passed therethrough at a flow rate of 5.3 cm/s of 15 Pa or greater and less than 55 Pa,
    the pre-collection member having a collection efficiency of NaCl particles having a particle diameter of 0.3 μm when air containing the particles is passed therethrough at a flow rate of 5.3 cm/s of 25% or greater and less than 80%,
    the pre-collection member having a thickness of 0.4 mm or less,
    the pre-collection member alone having a PF value of 7 or greater and 15 or less, the PF value being determined from the following formula: PF value={−log((100−collection efficiency (%))/100)}/(pressure drop (Pa)/1000), and
    a ratio of the PF value of the pre-collection member alone to a PF value of the porous films including the first porous film and the second porous film overlapped with each other is 0.20 or greater and 0.45 or less.

10. The method for producing a filter medium for an air filter according to claim 9, further comprising:
    arranging an upstream air-permeable support member to support the first porous film to the upstream side of the first porous film in the air current.

11. The method for producing a filter medium for an air filter according to claim 9, further comprising
arranging a downstream air-permeable support member to support the second porous film to the downstream side of the second porous film in the air current.

* * * * *